(12) United States Patent
Xu et al.

(10) Patent No.: US 12,659,802 B2
(45) Date of Patent: Jun. 16, 2026

(54) COMMUNICATION METHOD AND APPARATUS

(71) Applicant: Huawei Technologies Co., Ltd., Shenzhen (CN)

(72) Inventors: Yishan Xu, Shanghai (CN); Hualin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 377 days.

(21) Appl. No.: 18/054,341

(22) Filed: Nov. 10, 2022

(65) Prior Publication Data

US 2023/0070345 A1 Mar. 9, 2023

Related U.S. Application Data

(63) Continuation of application No. PCT/CN2021/073722, filed on Jan. 26, 2021.

(30) Foreign Application Priority Data

May 13, 2020 (CN) .......................... 202010403059.0

(51) Int. Cl.
*H04W 28/10* (2009.01)

(52) U.S. Cl.
CPC ................................... *H04W 28/10* (2013.01)

(58) Field of Classification Search
CPC ..... H04W 28/10; H04W 28/02; H04W 28/08; H04W 28/01; H04W 28/24; H04W 28/20;
(Continued)

(56) References Cited

U.S. PATENT DOCUMENTS 8,897,392 B2 * 11/2014 Lin ........................ H04B 7/068
375/299
9,622,018 B2 * 4/2017 Zhao ...................... H04W 4/20
(Continued)

FOREIGN PATENT DOCUMENTS

CN 102440025 A 5/2012
CN 102804707 A 11/2012
(Continued)

OTHER PUBLICATIONS

3GPP TS 23.501 V16.4.0 (Mar. 2020), 3rd Generation Partnership Project; Technical Specification Group Services and System Aspects; System architecture for the 5G System (5GS);Stage 2(Release 16), 430 pages.

(Continued)

*Primary Examiner* — Man U Phan
(74) *Attorney, Agent, or Firm* — WOMBLE BOND DICKINSON (US) LLP

(57) ABSTRACT

Embodiments of this application provide a communication method and apparatus, and relate to the communication field. The method in embodiments of this application includes: A control network element determines to use a same transmission path as a second service data flow for a first service data flow. The control network element sends first indication information to a target network element, where the first indication information indicates to transmit the first service data flow through a same transmission path as the second service data flow. In this way, the first service data flow and the second service data flow can be synchronously transmitted, to resolve a problem of a large transmission delay difference or asynchronization resulting from selecting different transmission paths for the service data flows.

20 Claims, 12 Drawing Sheets

(58) Field of Classification Search

CPC ..... H04W 40/34; H04W 40/12; H04W 76/10; H04W 76/11; H04W 76/12; H04W 76/15; H04W 76/25; H04L 47/12; H04L 12/85; H04L 12/26; H04L 12/81; H04L 29/08; H04L 47/24; H04L 43/08; H04L 47/20; H04L 67/14; H04L 67/16

USPC ......................................................... 370/235

See application file for complete search history.

(56) References Cited

U.S. PATENT DOCUMENTS

| | | | | |
|---|---|---|---|---|
| 10,205,652 | B2 * | 2/2019 | Liu | H04L 45/28 |
| 10,848,963 | B2 * | 11/2020 | Cai | H04W 48/16 |
| 11,140,676 | B2 * | 10/2021 | Li | H04W 76/18 |
| 11,184,284 | B2 * | 11/2021 | Trimponias | H04L 61/5007 |
| 11,296,834 | B2 * | 4/2022 | Heer | H04L 1/0041 |
| 11,606,786 | B2 * | 3/2023 | Li | H04W 74/004 |
| 11,863,322 | B2 * | 1/2024 | Xu | H04L 47/12 |
| 2012/0063319 | A1 | 3/2012 | Christin et al. | |
| 2018/0199291 | A1 | 7/2018 | Brisebois et al. | |
| 2023/0396549 | A1 * | 12/2023 | Xiong | H04L 47/125 |
| 2024/0244419 | A1 * | 7/2024 | Yuan | H04W 8/20 |

FOREIGN PATENT DOCUMENTS

| | | |
|---|---|---|
| CN | 105934971 A | 9/2016 |
| CN | 109412771 A | 3/2019 |
| CN | 110831070 A | 2/2020 |
| CN | 110999520 A | 4/2020 |

OTHER PUBLICATIONS

3GPP TS 23.502 V16.0.2 (Apr. 2019);3rd Generation Partnership Project;Technical Specification Group Services and System Aspects;Procedures for the 5G System;Stage 2(Release 16);total 419 pages.

3GPP TS 23.503 V16.4.1:"3rd Generation Partnership Project;Technical Specification Group Services and System Aspects;Policy and charging control framework for the5G System (5GS);Stage 2(Release 16)",Apr. 2020,total 115 pages.

ZTE: "PCC handling for MPTCP and ATSSS-LL with any Steering Mode", 3GPP Draft; S2-2002267, Feb. 19, 2020, XP051855696, total 4 pages.

* cited by examiner

COMMUNICATION METHOD AND APPARATUS

CROSS-REFERENCE TO RELATED APPLICATIONS

This is a continuation of International Application No. PCT/CN2021/073722, filed on Jan. 26, 2021, which claims priority to claims priority to Chinese Patent Application No. 202010403059.0, filed on May 13, 2020. The disclosures of the aforementioned applications are hereby incorporated by reference in their entireties.

TECHNICAL FIELD

This application relates to communication technologies, and in particular, to a communication method and apparatus.

BACKGROUND

In a 5th generation (5G) communication system, user equipment (UE) and a user plane function (UPF) network element may transmit a service data flow during communication.

When the UE or the UPF network element transmits a service data flow, a core network may select a steering mode for the service data flow, and the UE or the UPF network element may transmit the service data flow in the steering mode selected by the core network. However, a large transmission delay difference between transmission paths of an application service data flow is prone to occur in the existing steering mode, affecting user experience.

SUMMARY

Embodiments of this application provide a communication method and apparatus, to indicate to select a same transmission path for a first service data flow and a second service data flow, so that the first service data flow and the second service data flow can be synchronously transmitted, to resolve a problem such as a large transmission delay difference or asynchronization resulting from selecting different transmission paths are selected for the service data flows.

According to some embodiments, the present disclosure provides a communication method, including: A control network element determines to use a same transmission path as a second service data flow for a first service data flow. The control network element sends first indication information to a target network element, where the first indication information indicates to transmit the first service data flow through a same transmission path as the second service data flow. In this way, it can indicate to select a same transmission path for the first service data flow and the second service data flow, so that the first service data flow and the second service data flow can be synchronously transmitted, to resolve a problem of a large transmission delay difference or asynchronization resulting from selecting different transmission paths the service data flows.

In some embodiments, that the first indication information indicates to transmit the first service data flow through a same transmission path as the second service data flow includes: The first indication information indicates the target network element to transmit the first service data flow in a preset transmission mode, where in the preset transmission mode, the first service data flow and the second service data flow are transmitted through a same transmission path.

In some embodiments, the first indication information includes identification information of the first service data flow and identification information of the second service data flow.

In some embodiments, the control network element sends identification information of the first service data flow and identification information of the second service data flow to the target network element.

In some embodiments, the control network element sends identification information of the first service data flow, identification information of the second service data flow, and information about a transmission mode of the second service data flow to the target network element.

In some embodiments, the control network element sends, to the target network element, identification information of the first service data flow, identification information of the second service data flow, and information about a transmission mode used by both the first service data flow and the second service data flow.

In some embodiments, the control network element receives second indication information from an application layer network element, where the second indication information indicates that the first service data flow needs to be associated with the second service data flow.

In some embodiments, the control network element receives third indication information from a user plane network element, where the third indication information indicates that the first service data flow needs to be associated with the second service data flow.

In some embodiments, the third indication information is a reported event.

In some embodiments, that the control network element sends first indication information to a target network element includes: The control network element sends the first indication information to the target network element via a session management network element; or the control network element sends the first indication information to the target network element via a session management network element and a mobility management network element.

In some embodiments, a service data flow identifier includes one or more of the following: a service data flow 5-tuple identifier, an application identifier, a quality of service QoS flow identifier, a service type identifier, an application type identifier, or a service data flow address identifier.

In some embodiments, the transmission path of the second service data flow includes a first transmission path using a first access technology and/or a second transmission path using a second access technology.

According to some embodiments, the present disclosure provides a communication method, including: A user plane network element obtains first indication information from a control network element, where the first indication information indicates to transmit a first service data flow through a same transmission path as a second service data flow. The user plane network element transmits, based on the first indication information, the first service data flow through a same transmission path as the second service data flow.

In some embodiments, the method further includes: The user plane network element determines the first service data flow and the second service data flow that need to be associated. The user plane network element sends third indication information to the control network element, where the third indication information indicates that the first service data flow needs to be associated with the second service data flow.

In some embodiments, the third indication information is a reported event.

In some embodiments, that the user plane network element determines the first service data flow and the second service data flow that need to be associated includes: The user plane network element determines, based on destination addresses of the first service data flow and the second service data flow, the first service data flow and the second service data flow that need to be associated.

According to some embodiments, the present disclosure provides a communication method, including: A session management network element receives first information from a control network element, where the first information indicates to transmit a first service through a same transmission path as a second service data flow.

The session management network element sends second information to a terminal device or a user plane network element, where the second information indicates to transmit the first service data flow through a same transmission path as the second service data flow.

In some embodiments, that the second information indicates to transmit the first service data flow through a same transmission path as the second service data flow includes: The second information indicates a target network element to transmit the first service data flow in a preset transmission mode, where in the preset transmission mode, the first service data flow and the second service data flow are transmitted through a same transmission path.

In some embodiments, the second information includes an identifier of the first service data flow and an identifier of the second service data flow; the second information includes an identifier of the first service data flow, an identifier of the second service data flow, and a transmission mode of the second service data flow; or the second information includes an identifier of the first service data flow, an identifier of the second service data flow, and a transmission mode used by both the first service data flow and the second service data flow.

According to some embodiments, the present disclosure provides a communication apparatus. The communication apparatus may be a control network element, or may be a chip or a chip system in the control network element. The communication apparatus may include a processing unit and a communication unit. When the communication apparatus is the control network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit. When the communication apparatus is the chip or the chip system in the control network element, the processing unit may be a processor, and the communication unit may be a communication interface. For example, the communication interface may be an input/output interface, a pin, or a circuit. The storage unit may be a storage unit (for example, a register or a cache) in the chip, or may be a storage unit (for example, a read-only memory or a random access memory) that is in the control network element and that is outside the chip. For example, the control network element may be a network element configured to implement a control function, such as a policy control network element or a session management network element.

For example, the processing unit is configured to determine to use a same transmission path as a second service data flow for a first service data flow. The communication unit is configured to send first indication information to a target network element, where the first indication information indicates to transmit the first service data flow through a same transmission path as the second service data flow.

In some embodiments, that the first indication information indicates to transmit the first service data flow through a same transmission path as the second service data flow includes: The first indication information indicates the target network element to transmit the first service data flow in a preset transmission mode, where in the preset transmission mode, the first service data flow and the second service data flow are transmitted through a same transmission path.

In some embodiments, the first indication information includes identification information of the first service data flow and identification information of the second service data flow.

In some embodiments, the communication unit is further configured to send identification information of the first service data flow and identification information of the second service data flow to the target network element.

In some embodiments, the communication unit is further configured to send identification information of the first service data flow, identification information of the second service data flow, and information about a transmission mode of the second service data flow to the target network element.

In some embodiments, the communication unit is further configured to send, to the target network element, identification information of the first service data flow, identification information of the second service data flow, and information about a transmission mode used by both the first service data flow and the second service data flow.

In some embodiments, the communication unit is further configured to receive second indication information from an application layer network element, where the second indication information indicates that the first service data flow needs to be associated with the second service data flow.

In some embodiments, the communication unit is further configured to receive third indication information from a user plane network element, where the third indication information indicates that the first service data flow needs to be associated with the second service data flow.

In some embodiments, the third indication information is a reported event.

In some embodiments, the communication unit is specifically configured to send the first indication information to the target network element via a session management network element; or send the first indication information to the target network element via a session management network element and a mobility management network element.

In some embodiments, a service data flow identifier includes one or more of the following: a service data flow 5-tuple identifier, an application identifier, a quality of service QoS flow identifier, a service type identifier, an application type identifier, or a service data flow address identifier.

In some embodiments, the transmission path of the second service data flow includes a first transmission path using a first access technology and/or a second transmission path using a second access technology.

According to some embodiments, the present disclosure provides a communication apparatus. The communication apparatus may be a user plane network element, or may be a chip or a chip system in the user plane network element. The communication apparatus may include a processing unit and a communication unit. When the communication apparatus is the user plane network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit. When the communication apparatus is the chip or the chip system in the user plane network element, the processing unit may be a processor, and the communication unit may be a communication interface. For example, the communication interface may be an input/output interface, a pin, or a circuit. The processing unit executes the instructions stored in the storage unit. The storage unit may be a storage unit (for example, a register or a cache) in the chip, or may be a storage unit (for example, a read-only memory or a random access memory) that is in the user plane network element and that is outside the chip.

For example, the communication unit is configured to obtain first indication information from a control network element, where the first indication information indicates to transmit a first service data flow through a same transmission path as a second service data flow. The processing unit is configured to transmit, based on the first indication information, the first service data flow through a same transmission path as the second service data flow.

In some embodiments, the processing unit is further configured to determine the first service data flow and the second service data flow that need to be associated. The communication unit is further configured to send third indication information to the control network element, where the third indication information indicates that the first service data flow needs to be associated with the second service data flow.

In some embodiments, the third indication information is a reported event.

In some embodiments, the processing unit is specifically configured to determine, based on destination addresses of the first service data flow and the second service data flow, the first service data flow and the second service data flow that need to be associated.

According to some embodiments, the present disclosure provides a communication apparatus. The communication apparatus may be a session management network element, or may be a chip or a chip system in the session management network element. The communication apparatus may include a processing unit and a communication unit. When the communication apparatus is the session management network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit. When the communication apparatus is the chip or the chip system in the session management network element, the processing unit may be a processor, and the communication unit may be a communication interface. For example, the communication interface may be an input/output interface, a pin, or a circuit. The processing unit executes the instructions stored in the storage unit. The storage unit may be a storage unit (for example, a register or a cache) in the chip, or may be a storage unit (for example, a read-only memory or a random access memory) that is in the session management network element and that is outside the chip.

For example, the communication unit is configured to receive first information from a control network element, where the first information indicates to transmit a first service data flow through a same transmission path as a second service data flow.

The communication unit is further configured to send second information to a terminal device or a user plane network element, where the second information indicates to transmit the first service data flow through a same transmission path as the second service data flow.

In some embodiments, that the second information indicates to transmit the first service data flow through a same transmission path as the second service data flow includes: The second information indicates a target network element to transmit the first service data flow in a preset transmission mode, where in the preset transmission mode, the first service data flow and the second service data flow are transmitted through a same transmission path.

In some embodiments, the second information includes an identifier of the first service data flow and an identifier of the second service data flow; the second information includes an identifier of the first service data flow, an identifier of the second service data flow, and a transmission mode of the second service data flow; or the second information includes an identifier of the first service data flow, an identifier of the second service data flow, and a transmission mode used by both the first service data flow and the second service data flow.

According to some embodiments, the present disclosure provides a computer-readable storage medium. The computer-readable storage medium stores a computer program or instructions. When the computer program or the instructions are run on a computer, the computer is enabled to perform the communication method in any one of the embodiments of the present disclosure.

According to some embodiments, the present disclosure provides a computer program product including instructions. When the instructions are run on a computer, the computer is enabled to perform the communication method in any one of embodiments of the present disclosure.

According to some embodiments, the present disclosure provides a communication system that includes a communication apparatus.

According to some embodiments, the present disclosure provides a communication apparatus. The communication apparatus includes a processor and a storage medium. The storage medium stores instructions. When the instructions are run by the processor, the communication method described in any one of the embodiments in the present disclosure.

According to some embodiments, the present disclosure provides a chip or a chip system. The chip or the chip system includes at least one processor and a communication interface. The communication interface and the at least one processor are interconnected through a line. The at least one processor is configured to run a computer program or instructions, to perform the communication method described in any one of the embodiments in the present disclosure.

The communication interface in the chip may be an input/output interface, a pin, a circuit, or the like.

In some embodiments, the chip or the chip system described in this application further includes at least one memory, and the at least one memory stores instructions. The memory may be a storage unit in the chip, for example, a register or a cache, or may be a storage unit (for example, a read-only memory or a random access memory) of the chip.

According to some embodiments, the present disclosure provides a communication method, including: A control network element determines a packet loss rate threshold of a first service data flow. The control network element sends first information to a target network element based on the packet loss rate threshold, where the first information includes fourth indication information, and the fourth indication information indicates to transmit the first service data flow in a first transmission mode. The first transmission mode is a dynamic redundant transmission mode. In this way, a redundant transmission-steering mode may be dynamically selected for a service data flow. When packet loss rates of a plurality of transmission paths do not meet a requirement, data of the service data flow is duplicated and separately transmitted through the plurality of transmission paths, to decrease the packet loss rate.

In some embodiments, the first information further includes the packet loss rate threshold, and the first transmission mode is: when there is a transmission path with a packet loss rate less than or equal to the packet loss rate threshold in the plurality of transmission paths, transmitting the first service data flow through the transmission path with a packet loss rate less than or equal to the packet loss rate threshold in the plurality of transmission paths; and when the packet loss rates of the plurality of transmission paths are all greater than the packet loss rate threshold, redundantly transmitting the first service data flow through the plurality of transmission paths.

In some embodiments, the plurality of transmission paths include a first transmission path using a first access technology and/or a second transmission path using a second access technology.

In some embodiments, the first information further includes identification information of the first service data flow.

In some embodiments, the method further includes: The control network element receives the identification information of the first service data flow and the packet loss rate threshold of the first service data flow from an application layer network element.

In some embodiments, the method further includes: The control network element receives, from a user plane network element, the identification information of the first service data flow and information indicating a packet loss rate of the first service data flow.

In some embodiments, the identification information of the first service data flow includes one or more of the following:

a service data flow 5-tuple identifier, an application identifier, a QoS flow identifier, a service type identifier, an application type identifier, or a service data flow address identifier.

According to some embodiments, the present disclosure provides a communication method, including: A user plane network element obtains first information from a control network element, where the first information includes fourth indication information, and the fourth indication information indicates to transmit a first service data flow in a first transmission mode. The first transmission mode is a dynamic redundant transmission mode. The user plane network element transmits the first service data flow in the first transmission mode.

In some embodiments, the first information further includes a packet loss rate threshold, and the first transmission mode is: when there is a transmission path with a packet loss rate less than or equal to the packet loss rate threshold in the plurality of transmission paths, transmitting the first service data flow through the transmission path with a packet loss rate less than or equal to the packet loss rate threshold in the plurality of transmission paths; and when packet loss rates of the plurality of transmission paths are all greater than the packet loss rate threshold, redundantly transmitting the first service data flow through the plurality of transmission paths.

In some embodiments, that the user plane network element transmits the first service data flow in the first transmission mode includes: When the packet loss rates of the plurality of transmission paths are all greater than the packet loss rate threshold, the user plane network element redundantly transmits the first service data flow through the plurality of transmission paths; and when there is a transmission path with a packet loss rate less than or equal to the packet loss rate threshold in the plurality of transmission paths, the user plane network element transmits the first service data flow through the transmission path with the packet loss rate less than or equal to the packet loss rate threshold in the plurality of transmission paths.

In some embodiments, the method further includes: The user plane network element determines information about a packet loss rate of the first service data flow. The user plane network element sends identification information of the first service data flow and the information about the packet loss rate of the first service data flow to the control network element.

In some embodiments, that the user plane network element determines information about a packet loss rate of the first service data flow includes:

When the user plane network element detects that the packet loss rate of the first service data flow is greater than a preset value, the user plane network element determines the information about the packet loss rate of the first service data flow.

According to some embodiments, the present disclosure provides a communication method, including: A session management network element receives first information from a control network element, where the first information includes fourth indication information, and the fourth indication information indicates to transmit a first service data flow in a first transmission mode. The first transmission mode is a dynamic redundant transmission mode. The session management network element sends second information to a terminal device or a user plane network element, where the second information includes fifth indication information, and the fifth indication information indicates to transmit the first service data flow in the first transmission mode.

In some embodiments, the second information further includes a packet loss rate threshold, and the first transmission mode is: when there is a transmission path with a packet loss rate less than or equal to the packet loss rate threshold in the plurality of transmission paths, transmitting the first service data flow through the transmission path with a packet loss rate less than or equal to the packet loss rate threshold in the plurality of transmission paths; and when packet loss rates of the plurality of transmission paths are all greater than the packet loss rate threshold, redundantly transmitting the first service data flow through the plurality of transmission paths.

In some embodiments, the plurality of transmission paths include a first transmission path using a first access technology and/or a second transmission path using a second access technology.

According to some embodiments, the present disclosure provides a communication apparatus. The communication apparatus may be a control network element, or may be a chip or a chip system in the control network element. The communication apparatus may include a processing unit and a communication unit. When the communication apparatus is the control network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the control network element implements the communication method in any one of the embodiments described in the present disclosure. When the communication apparatus is the chip or the chip system in the control network element, the processing unit may be a processor, and the communication unit may be a communication interface. For example, the communication interface may be an input/output interface, a pin, or a circuit. The processing unit executes the instructions stored in the storage unit, so that the control network element implements the communication method in any one of the embodiments described in the present disclosure. The storage unit may be a storage unit (for example, a register or a cache) in the chip, or may be a storage unit (for example, a read-only memory or a random access memory) that is in the control network element and that is outside the chip. For example, the control network element may be a network element configured to implement a control function, such as a policy control network element or a session management network element.

For example, the processing unit is configured to determine a packet loss rate threshold of a first service data flow. The communication unit is configured to send first information to a target network element based on the packet loss rate threshold, where the first information includes fourth indication information, and the fourth indication information indicates to transmit the first service data flow in a first transmission mode. The first transmission mode is a dynamic redundant transmission mode.

In some embodiments, the first information further includes the packet loss rate threshold, and the first transmission mode is: when there is a transmission path with a packet loss rate less than or equal to the packet loss rate threshold in the plurality of transmission paths, transmitting the first service data flow through the transmission path with a packet loss rate less than or equal to the packet loss rate threshold in the plurality of transmission paths; and when packet loss rates of the plurality of transmission paths are all greater than the packet loss rate threshold, redundantly transmitting the first service data flow through the plurality of transmission paths.

In some embodiments, the plurality of transmission paths include a first transmission path using a first access technology and/or a second transmission path using a second access technology.

In some embodiments, the first information further includes identification information of the first service data flow.

In some embodiments, the communication unit is further configured to receive the identification information of the first service data flow and the packet loss rate threshold of the first service data flow from an application layer network element.

In some embodiments, the communication unit is further configured to receive, from a user plane network element, the identification information of the first service data flow and information indicating a packet loss rate of the first service data flow.

In some embodiments, the identification information of the first service data flow includes one or more of the following: a service data flow 5-tuple identifier, an application identifier, a QoS flow identifier, a service type identifier, an application type identifier, or a service data flow address identifier.

According to some embodiments, the present disclosure provides a communication apparatus. The communication apparatus may be a user plane network element, or may be a chip or a chip system in the user plane network element. The communication apparatus may include a processing unit and a communication unit. When the communication apparatus is the user plane network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the user plane network element implements the communication method in any one of the embodiments described in the present disclosure. When the communication apparatus is the chip or the chip system in the user plane network element, the processing unit may be a processor, and the communication unit may be a communication interface. For example, the communication interface may be an input/output interface, a pin, or a circuit. The processing unit executes the instructions stored in the storage unit, so that the user plane network element implements the communication method in any one of the embodiments described in the present disclosure. The storage unit may be a storage unit (for example, a register or a cache) in the chip, or may be a storage unit (for example, a read-only memory or a random access memory) that is in the user plane network element and that is outside the chip.

For example, the communication unit is configured to obtain first information from a control network element, where the first information includes fourth indication information, and the fourth indication information indicates to transmit a first service data flow in a first transmission mode. The first transmission mode is a dynamic redundant transmission mode. The processing unit is configured to transmit a first service data flow in a first transmission mode.

In some embodiments, the first information further includes a packet loss rate threshold, and the first transmission mode is: when there is a transmission path with a packet loss rate less than or equal to the packet loss rate threshold in the plurality of transmission paths, transmitting the first service data flow through the transmission path with a packet loss rate less than or equal to the packet loss rate threshold in the plurality of transmission paths; and when packet loss rates of the plurality of transmission paths are all greater than the packet loss rate threshold, redundantly transmitting the first service data flow through the plurality of transmission paths.

In some embodiments, the processing unit is specifically configured to: when the packet loss rates of the plurality of transmission paths are all greater than the packet loss rate threshold, redundantly transmit the first service data flow through the plurality of transmission paths; and when there is a transmission path with a packet loss rate less than or equal to the packet loss rate threshold in the plurality of transmission paths, transmit the first service data flow through the transmission path with the packet loss rate less than or equal to the packet loss rate threshold in the plurality of transmission paths.

In some embodiments, the processing unit is further configured to determine information about a packet loss rate of the first service data flow. The communication unit is further configured to send identification information of the first service data flow and the information about the packet loss rate of the first service data flow to the control network element.

In some embodiments, the processing unit is specifically configured to: when it is detected that the packet loss rate of the first service data flow is greater than a preset value, determine the information about the packet loss rate of the first service data flow.

According to some embodiments, the present disclosure provides a communication apparatus. The communication apparatus may be a session management network element, or may be a chip or a chip system in the session management network element. The communication apparatus may include a processing unit and a communication unit. When the communication apparatus is the session management network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the session management network element implements the communication method in any one of the embodiments described in the present disclosure. When the communication apparatus is the chip or the chip system in the session management network element, the processing unit may be a processor, and the communication unit may be a communication interface. For example, the communication interface may be an input/output interface, a pin, or a circuit. The processing unit executes the instructions stored in the storage unit, so that the session management network element implements the communication method in any one of the embodiments described in the present disclosure. The storage unit may be a storage unit (for example, a register or a cache) in the chip, or may be a storage unit (for example, a read-only memory or a random access memory) that is in the session management network element and that is outside the chip.

For example, the communication unit is configured to receive first information from a control network element, where the first information includes fourth indication information, and the fourth indication information indicates to transmit a first service data flow in a first transmission mode. The first transmission mode is a dynamic redundant transmission mode. The communication unit is further configured to send second information to a terminal device or a user plane network element, where the second information includes fifth indication information, and the fifth indication information indicates to transmit the first service data flow in the first transmission mode.

In some embodiments, the second information further includes a packet loss rate threshold, and the first transmission mode is: when there is a transmission path with a packet loss rate less than or equal to the packet loss rate threshold in the plurality of transmission paths, transmitting the first service data flow through the transmission path with a packet loss rate less than or equal to the packet loss rate threshold in the plurality of transmission paths; and when packet loss rates of the plurality of transmission paths are all greater than the packet loss rate threshold, redundantly transmitting the first service data flow through the plurality of transmission paths.

In some embodiments, the plurality of transmission paths include a first transmission path using a first access technology and/or a second transmission path using a second access technology.

According to some embodiments, the present disclosure provides a computer-readable storage medium. The computer-readable storage medium stores a computer program or instructions. When the computer program or the instructions are run on a computer, the computer is enabled to perform the communication method in any one of the embodiments described in the present disclosure.

According to some embodiments, the present disclosure provides a computer program product including instructions. When the instructions are run on a computer, the computer is enabled to perform the communication method in any one of the embodiments described in the present disclosure.

According to some embodiments, the present disclosure provides a communication system that includes a communication apparatus according to some embodiments discussed in the present disclosure.

According to some embodiments, the present disclosure provides a communication apparatus. The communication apparatus includes a processor and a storage medium. The storage medium stores instructions. When the instructions are run by the processor, the communication method described in any one of the embodiments described in the present disclosure.

According to some embodiments, the present disclosure provides a chip or a chip system. The chip or the chip system includes at least one processor and a communication interface. The communication interface and the at least one processor are interconnected through a line. The at least one processor is configured to run a computer program or instructions, to perform the communication method described in any one of the embodiments described in the present disclosure.

The communication interface in the chip may be an input/output interface, a pin, a circuit, or the like.

In some embodiments, the chip or the chip system described in this application further includes at least one memory, and the at least one memory stores instructions. The memory may be a storage unit in the chip, for example, a register or a cache, or may be a storage unit (for example, a read-only memory or a random access memory) of the chip.

It should be understood that the second aspect to the eleventh aspect of embodiments of this application correspond to the technical solutions of the first aspect of embodiments of this application, and the thirteenth aspect to the twenty-second aspect correspond to the technical solutions of the twelfth aspect of embodiments of this application. Beneficial effects achieved by the aspects and corresponding feasible embodiments are similar, and details are not described again.

DESCRIPTION OF EMBODIMENTS

To clearly describe the technical solutions in embodiments of this application, words such as "first" and "second" are used in embodiments of this application to distinguish between same items or similar items that provide basically same functions or purposes. For example, a first service data flow and a second service data flow are merely intended to distinguish different service data flows, but not to limit a sequential order thereof. A person skilled in the art may understand that the terms such as "first" and "second" do not limit a quantity or an execution sequence, and the terms such as "first" and "second" do not indicate a definite difference.

It should be noted that, in this application, the terms such as "example" or "for example" are used to represent giving an example, an illustration, or a description. Any embodiment described as "example" or "for example" in this application should not be explained as being more preferred or having more advantages than another embodiment. Exactly, use of the terms such as "example" or "for example" is intended to present a relative concept in a manner.

In this application, "at least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one item (piece) of the following" or a similar expression thereof indicates any combination of the items, including any combination of singular items (pieces) or plural items (pieces). For example, at least one of a, b, or c may indicate: a, b, c, a and b, a and c, b and c, or a, b, and c, where a, b, and c may be singular or plural.

Embodiments of this application provide a communication method. The method in embodiments of this application may be applied to a 5G system, or may be applied to long term evolution (LTE), or a next-generation mobile communication system.

Figure 1:
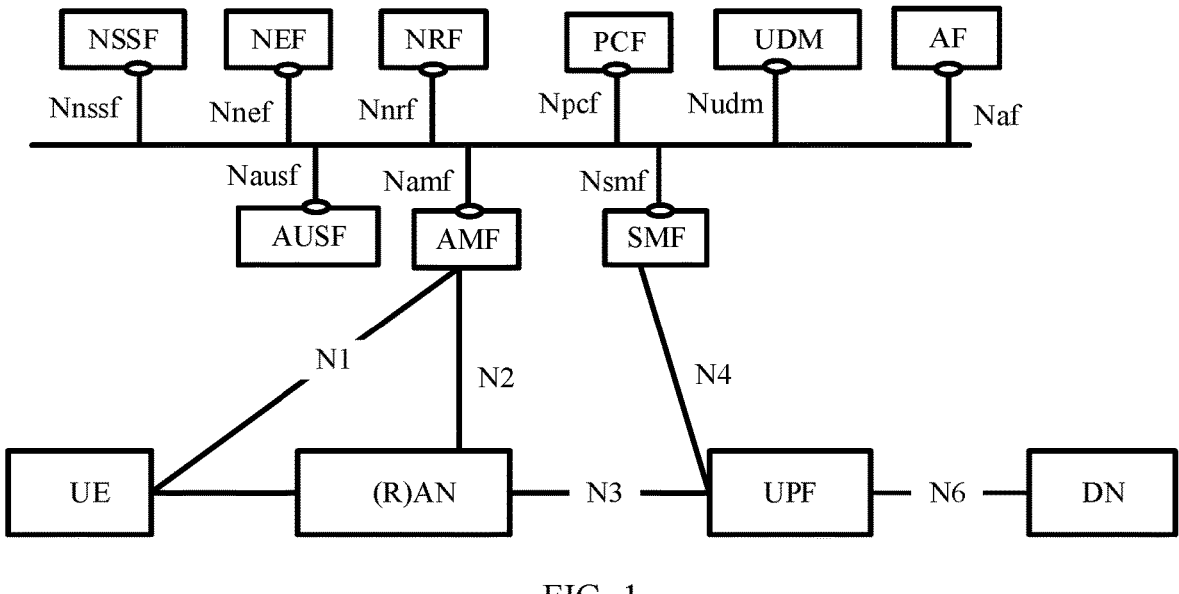
FIG. 1 is a schematic diagram of a network architecture according to an embodiment of this application.

For example, FIG. 1 is a schematic diagram of a network architecture according to an embodiment of this application. The architecture supports access to a core network (CN) using a wireless technology (for example, a 5G radio access network (RAN)) that is defined by the $3^{rd}$ generation partnership project (3GPP) standard group, and also supports access to the core network using a non-3GPP access technology through a non-3GPP interworking function (N3IWF) or a next-generation access gateway (ngPDG).

The network architecture includes a terminal device, an access network (AN), a core network, and a data network (DN). An access network apparatus is mainly configured to implement functions such as a radio physical layer function, resource scheduling, radio resource management, radio access control, and mobility management. A core network device may include a management device and a gateway device. The management device is mainly for device registration, security authentication, mobility management, location management, and the like of the terminal device. The gateway device is mainly configured to: establish a channel to the terminal device, and forward a data packet between the terminal device and an external data network on the channel. The data network may include a network device (for example, a device such as a server or a router), and the data network is mainly for providing a plurality of data services for the terminal device. For example, an access network, a core network, and a data network in 5G are used as examples for description.

The access network in 5G may be a radio access network ((R)AN). A (R)AN device in the 5G system may include a plurality of 5G-(R)AN nodes. The 5G-(R)AN node may include an access point (AP) in a 3GPP access network or a non-3GPP access network such as a Wi-Fi network, a next-generation base station (which may be collectively referred to as a next-generation radio access network node (NG-RAN node)), where the next-generation base station includes a new radio NodeB (NR NodeB, gNB), a next-generation evolved NodeB (NG-eNB), a gNB in a form in which a central unit (CU) and a distributed unit (DU) are separated, a transmission reception point (TRP), a transmission point (TP), or another node.

The 5G core network (5GC/NGC) includes a plurality of functional units such as an access and mobility management function (AMF) network element, a session management function (SMF) network element, a user plane function (UPF) network element, an authentication server function (AUSF) network element, a policy control function (PCF) network element, an application function (AF) network element, a unified data management (UDM) function network element, a network slice selection function (NSSF) network element, and a network function (NEF) network element.

The AMF network element is mainly responsible for services such as mobility management and access management. The SMF network element is mainly responsible for session management, a dynamic host configuration protocol function, user plane function selection and control, and the like. The UPF network element is mainly responsible for functions related to an external connection to a data network (DN), user plane data packet routing and forwarding, packet filtering, quality of service (QoS) control, and the like. The DN mainly provides a service for user equipment, for example, provides a mobile operator service, an internet service, or a third-party service. The AUSF network element is mainly responsible for a function of authenticating the terminal device. The PCF network element is mainly responsible for providing a unified policy framework for network behavior management, providing a policy rule for a control plane function, obtaining registration information related to a policy decision, and the like. It should be noted that these functional units may independently work, or may be combined to implement some control functions, such as access control and mobility management functions such as access authentication, security encryption, and location registration of the terminal device, and session management functions such as establishment, release, and change of a user plane transmission path. The UDM network element is for unified user data management, and is mainly configured to store user equipment subscription data.

Functional units in the 5G system may communicate with each other through a next generation (NG) network interface. For example, the terminal device may transmit a control plane message to the AMF network element through an NG interface 1 (N1 for short). The RAN device may establish a user plane communication connection channel to the UPF through an NG interface 3 (N3 for short). The AN/RAN device may establish a control plane signaling connection to the AMF network element through an NG interface 2 (N2 for short). The UPF may exchange information with the SMF network element through an NG interface 4 (N4 for short). The UPF may exchange user plane data with the data network DN through an NG interface 6 (N6 for short). The AMF network element may exchange information with the SMF network element through an NG interface 11 (N11 for short). The SMF network element may exchange information with the PCF network element through an NG interface 7 (N7 for short). The AMF network element may exchange information with the AUSF through an NG interface 12 (N12 for short).

Figure 2:
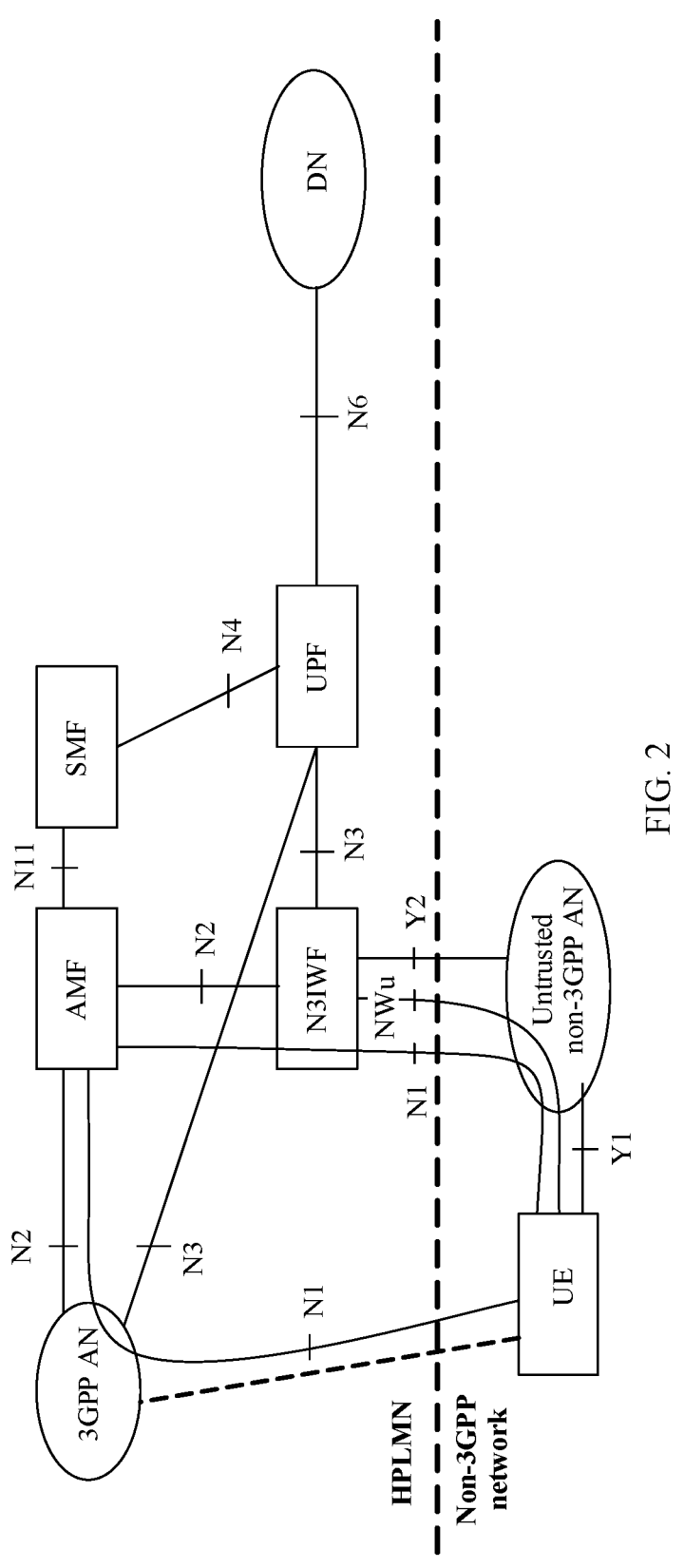
FIG. 2 is another schematic diagram of a network architecture according to an embodiment of this application.

For example, FIG. 2 is a schematic diagram of a network architecture when a core network supports untrusted non-3GPP access. A network architecture in a home public land mobile network (HPLMN) is similar to the embodiment shown in FIG. 1, and details are not described herein again. The untrusted non-3GPP access may be untrusted wireless local area network (WLAN) access. In this architecture, the terminal device may further exchange information with the AMF through the untrusted non-3GPP access, a non-3GPP interworking function (N3IWF), or a non-3GPP access gateway, and an N3IWF network element may exchange information with a UPF through N3.

In addition, the core network may further support trusted non-3GPP access and/or fixed network access. A trusted non-3GPP network includes a trusted WLAN network, and a fixed network includes fixed home network access and the like. A network side architecture is similar to an untrusted non-3GPP network architecture. The N3IWF and an untrusted access network are replaced with a trusted non-3GPP access network, or the N3IWF is replaced with a trusted non-3GPP access gateway, and the untrusted access network is replaced with a trusted access network. An access network device between the terminal device and the trusted non-3GPP access gateway may include a WLAN AP, a fixed access network (FAN) device, a switch, a router, and the like.

Regardless of the trusted non-3GPP access or the untrusted non-3GPP access, a point-to-point interface protocol shown in FIG. 1 may be used on a core network side, or a service-based interface architecture consistent with a 3GPP access core network architecture may be used. This is not specifically limited in embodiments of this application.

In some embodiments, a 3GPP access technology and a non-3GPP access technology may include a plurality of access standards or frequency bands, and the plurality of access standards or frequency bands may be simultaneously used. For example, 3GPP access includes simultaneous access to the 5GC using two access technologies: LTE in 4G and NG-RAN in 5G. Non-3GPP Wi-Fi access also includes simultaneous access in two frequency bands, for example, simultaneous access to the 5GC in a 5 GHz Wi-Fi frequency band and a 2.4 GHz Wi-Fi frequency band. In some embodiments, UE may simultaneously access the 5GC architecture in at least two of the foregoing four access manners (including simultaneous use of the four access manners).

The method processing in embodiments of this application may be applied to the foregoing 5G 3GPP access architecture, a non-3GPP access architecture, an architecture in which 3GPP access and non-3GPP access are simultaneously performed, an architecture in which 5G cellular (NG-RAN) access and 4G cellular (LTE) access are simultaneously performed, and the like. The network architecture is not specifically limited in embodiments of this application.

In embodiments of this application, the architecture including the 3GPP access and/or the non-3GPP access is used as an example for description.

Figure 3:
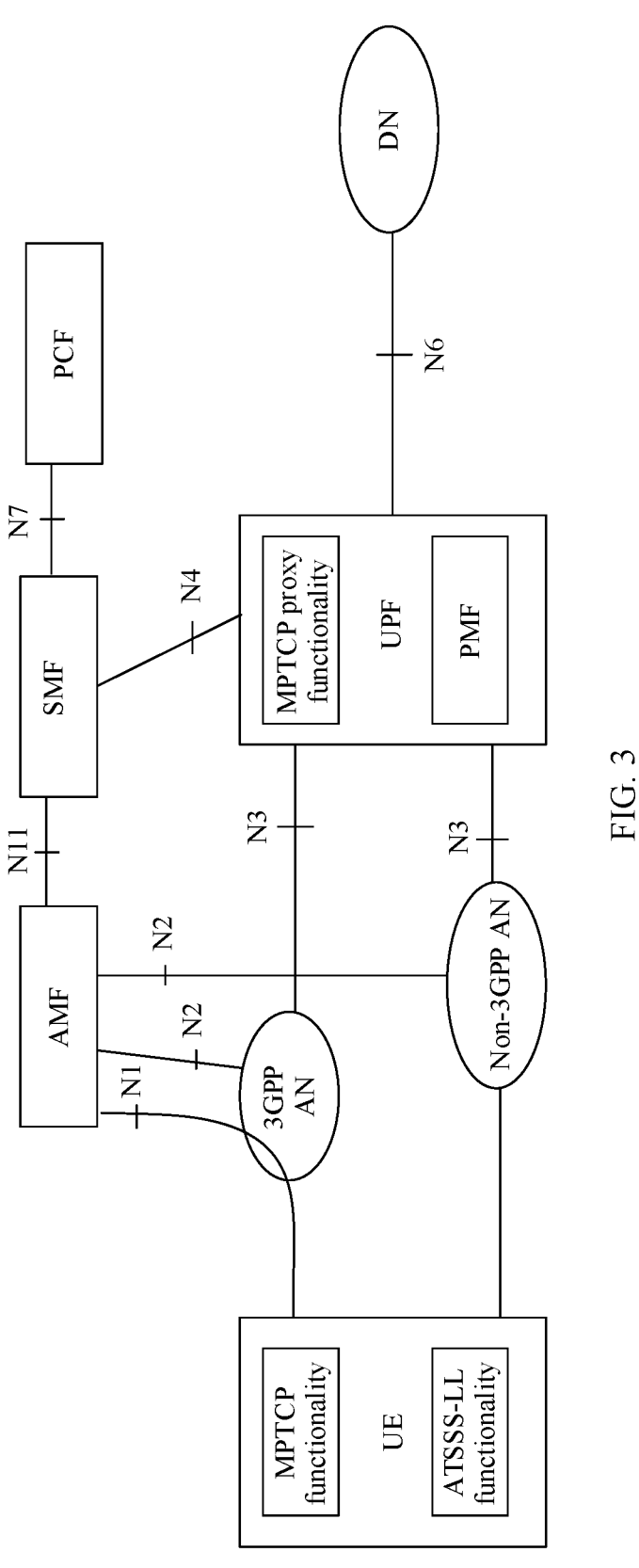
FIG. 3 is still another schematic diagram of a network architecture according to an embodiment of this application.

For example, FIG. 3 is a diagram of a network architecture of access traffic steering, switching, and splitting (ATSSS) of an access traffic. Both UE and a UPF network element can support an ATSSS feature. The UE and the UPF network element may transmit, using a 3GPP access network and/or a non-3GPP access network, a service data flow that needs to be sent, to improve transmission efficiency.

In a related technology, when the UE or the UPF network element transmits the service data flow, steering modes that may be used include: an Active-Standby steering mode, a Smallest Delay steering mode, a Load-Balancing steering mode, and a Priority-based steering mode.

In Active-Standby, one transmission path may be specified as active (3GPP access or non-3GPP access), and the other transmission path may be specified as standby. When the active transmission path is available, all data of the service data flow is transmitted to a peer end through the active transmission path. When the active path is unavailable, handover to the standby transmission path is performed for transmitting all the data of the service data flow.

In Smallest Delay, a transmission path with a smallest delay may be selected to transmit the data of the service data flow. In this mode, the UE or the UPF network element may monitor a transmission delay of a path in real time. For example, a transport layer protocol (for example, an MPTCP layer having an RTT detection function) may monitor the path, or a performance measurement function (PMF) module in the UPF network element may monitor the path.

In Load-Balancing, the data of the service data flow may be distributed, according to a proportion, to different transmission paths for transmission, and the distribution proportion may be determined based on load statuses of two current transmission paths in a network. For example, a path with heavier load has a lower distribution proportion, and a path with lighter load has a higher distribution proportion.

In Priority-based, one transmission path may be specified as a high-priority transmission path, and the other transmission path may be specified as a low-priority transmission path. When the high-priority transmission path is not congested, all the data of the service data flow is transmitted through the high-priority transmission path. When the high-priority transmission path is congested, some data of the service data flow is transmitted through the low-priority transmission path. When the high-priority transmission path is unavailable, all the data of the service data flow is transmitted through the low-priority transmission path.

However, in the foregoing steering modes, when a plurality of service data flows are transmitted, different steering modes may be selected for the plurality of service data flows. In this case, the plurality of service data flows are transmitted through different transmission paths. As a result, a large transmission delay may occur between the plurality of service data flows. For example, when a video file is transmitted, audio and a video footage in a video often do not correspond to each other.

An example in which the video file is transmitted is used, and a possible reason is that in the foregoing steering modes, a requirement of an application layer service data flow is seldom considered, for example, a video footage service data flow and an audio service data flow in video conference software. Although the video footage service data flow and the audio service data flow are different service data flows, they are associated and need to be transmitted to the peer end simultaneously as much as possible.

However, in a related technology, different service data flows may have different steering modes. Therefore, it is possible that steering modes of the video footage service data flow and the audio service data flow are different, resulting in different selected transmission paths. In this case, the two service data flows are transmitted through different transmission paths. Because a large transmission delay difference may exist between different transmission paths, a large time difference exists when the two different service data flows arrive at the peer end, and then a problem of asynchronization occurs. As a result, the audio and the video footage in the video do not correspond to each other, affecting user experience.

Based on this, in embodiments of this application, it can indicate to select a same transmission path for a first service data flow and a second service data flow, so that the first service data flow and the second service data flow can be synchronously transmitted, to resolve a problem of a large transmission delay difference or asynchronization resulting from selecting different transmission paths for the service data flows.

The following describes some terms in embodiments of this application.

A control network element in embodiments of this application may be a network element configured to perform a control function. For example, the control network element may be a PCF network element, an SMF network element, or another network element implementing the control function.

A target network element in embodiments of this application may be an SMF network element, a UPF network element, UE, or another network element that receives data from the control network element.

A session management network element described in embodiments of this application may be an SMF network element or another network element implementing a session management function. A user plane network element may be a UPF network element or another network element implementing a user plane function. A policy control network element may be a PCF network element or another network element implementing a policy control function. An application network element may be an AF network element or another network element implementing an application function. A network exposure network element may be a NEF network element or another network element implementing a network exposure function. A mobility management network element may be an AMF network element, another network element implementing a mobility management function, or the like.

For ease of description, subsequent embodiments of this application are described using an example in which the session management network element is the SMF network element, the user plane network element is the UPF network element, the control network element is the PCF network element, the application network element is the AF network element, and the network exposure element is the NEF network element. This example does not limit embodiments of this application.

A service data flow in embodiments of this application may be a service data flow using a user datagram protocol (UDP), a quick UDP internet connections (QUIC) protocol, a multi-path quick UDP internet connections (MP-QUIC) protocol, a transmission control protocol (TCP), a multi-path transmission control protocol (MPTCP), a stream control transmission protocol (SCTP), or another protocol. For example, the service data flow may be a PDU session established between a terminal device and a 5G core network (5GC) or a service data flow in the session; a PDN connection established between the terminal device and an EPC network or a service data flow in the PDN connection; an IP connection for non-seamless WLAN offload performed by the terminal device through a non-3GPP access network (for example, WLAN access) or a service data flow in the connection; a service data flow established between the terminal device and a network end in a future communication system; or the like.

Identification information (which may also be referred to as a service data flow identifier, information about a service data flow, or the like) of the service data flow in embodiments of this application may be one or more of the following: a PDU session identifier, an N4 session identifier, a session identifier, service data flow description information, an application identifier, a quality of service (QoS) flow identifier, a service type identifier, an application type identifier, a service data flow address identifier, or a terminal external identifier.

The PDU session identifier is session identification information of the PDU session. The N4 session identifier is session identification information of an N4 interface session (for example, a PFCP session: Packet Forwarding Control Protocol session).

The session identifier is identification information that can mark a session connection.

The service data flow description information may be at least one piece of service data flow internet protocol (IP) 5-tuple description information, and the 5-tuple description information may be a source IP address, a destination IP address, a source port number, a destination port number, and a protocol type. Alternatively, the service data flow description information may be at least one piece of Ethernet packet header information, for example, a source media access control (MAC) address and a destination MAC address, or a virtual local area network (VLAN) identifier. There may be one or more pieces of service data flow description information. This is not specifically limited in embodiments of this application.

The application identifier may identify a service data flow of an application program. Subsequently, the terminal device or the UPF network element may select a transmission link for a service data flow that includes the application identifier. There may be one or more application identifiers. This is not specifically limited in embodiments of this application.

The QoS flow identifier (QFI) may be an identifier of a QoS flow obtained by aggregating a plurality of service data flows whose QoS meets a relationship.

The service type identifier may be a type identifier of one or more types of service data flows. For example, the types of the service data flows may include a video service, a voice service, a game service, or a web browsing service.

The application type identifier may be a type identifier of one or more types of applications.

The terminal external identifier may also be referred to as an external identifier (EID) of a terminal, and may include the following two parts: a domain name identifier (DID) and a local identifier (LID). The domain name identifier may identify an access address of a service provided by an operator which may use different domain name identifiers to support access of different services. The local identifier may be for exporting or obtaining an international mobile subscriber identity (IMSI) of the terminal device. Alternatively, the terminal external identifier is a GPSI. For example, the GPSI is an external identifier or a phone number (MSISDN) of the terminal.

For example, when a PDU session type is IP, the identification information of the service data flow may be the 5-tuple information: the source IP address, the source port number, the destination IP address, the destination port number, and the protocol number. When the PDU session type is Ethernet, the identification information of the service data flow may be the source MAC address, the destination MAC address, an EtherType Ethernet type, or the like.

A transmission mode in embodiments of this application may include a mode used in data transmission, such as a steering mode.

A preset transmission mode in embodiments of this application may be referred to as an aggregated mode, a following mode, a traffics-binding steering mode, or the like. In the preset transmission mode, a same transmission path may be selected for service data flows that need to be transmitted together.

For example, in the preset transmission mode, a core network may bind service data flows having an association relationship, and select a same transmission mode for the service data flows having the association relationship.

For example, as shown in Table 1, for a plurality of service data flows (SDF): an SDF 1, an SDF 2, and an SDF 3, a steering mode of a service data flow in the SDF 1, the SDF 2, and the SDF 3 may be specified as a steering mode in a related technology (where for example, a steering mode of the SDF 1 is specified as Active-Standby), steering modes of the SDF 2 and the SDF 3 are specified as the preset transmission mode, and the SDF 2 and the SDF 3 are specified to follow the SDF 1. In other words, the steering modes of the SDF 2 and the SDF 3 are bound together with the SDF 1, and a same steering mode is used in a data transmission process. If the steering mode of the SDF 1 changes, the steering modes of the SDF 2 and the SDF 3 also change accordingly.

TABLE 1

| Service data flow | Steering mode |
|---|---|
| SDF 1 | Active-Standby |
| SDF 2 | Preset transmission mode (follow SDF 1) |
| SDF 3 | Preset transmission mode (follow SDF 1) |

In some embodiments, in correspondence to an indication in Table 1, when the UE or the UPF network element needs to transmit data of the SDF 1, the SDF 2, and the SDF 3, the UE or the UPF network element may select an Active-Standby steering mode. For example, if an active transmission path is available, the UE or the UPF network element transmits the data of the SDF 1, the SDF 2, and the SDF 3 through the active transmission path. If the active transmission path is unavailable, the UE or the UPF network element may transmit the data of the SDF 1, the SDF 2, and the SDF 3 through a standby transmission path.

The transmission path in embodiments of this application may be a transmission path of a multi-access protocol data unit (MA PDU). The transmission path may have different access standards (or referred to as access technologies). For example, the access standards may include NR, an evolved UMTS terrestrial radio access network (E-UTRAN), multefire, a 3GPP access technology, a non-3GPP access technology, a 4G cellular access technology, a 5G cellular access technology, a trusted Wi-Fi access technology or an untrusted Wi-Fi access technology, a fixed network, or a wired access technology.

For example, a transmission path of a service data flow may include a transmission path using one or more of the foregoing access technologies.

Data transmission in embodiments of this application may include a process of data sending, data receiving, or data exchange. For example, data transmission performed between the terminal device and the UPF network element may include: The terminal device sends data to the UPF network element, or the UPF network element sends data to the terminal device, or the terminal device sends data to the UPF network element and receives data from the UPF, or the UPF network element sends data to the terminal device and receives data from the UPF network element.

By using embodiments, the following describes in detail the technical solutions of this application and how to resolve the foregoing technical problem using the technical solutions of this application. The following several embodiments may be implemented independently or combined with each other, and same or similar concepts or processes may not be repeatedly described in some embodiments.

Figure 4:
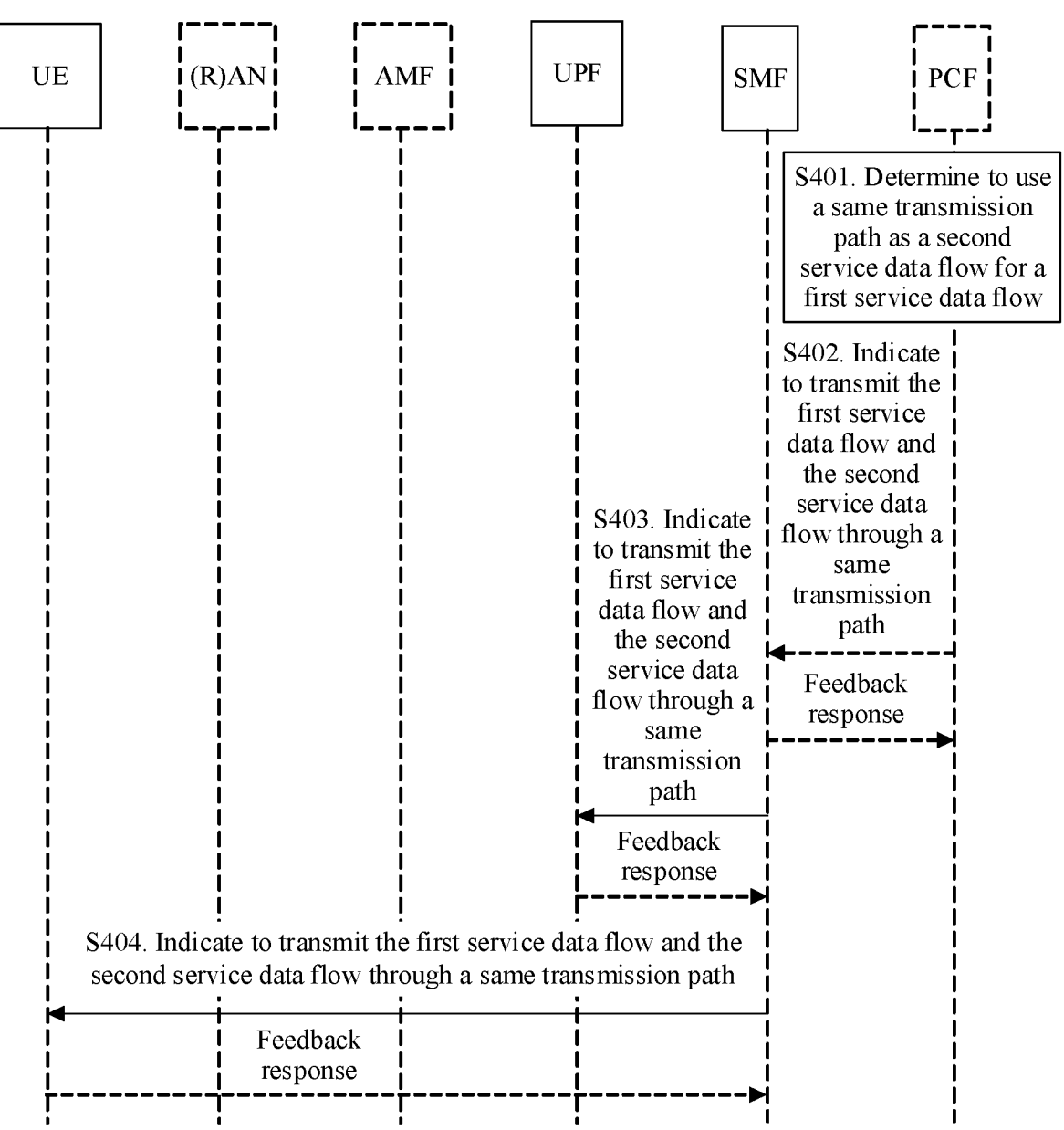
FIG. 4 is a schematic flowchart of a communication method according to an embodiment of this application.

FIG. 4 is a schematic flowchart of a communication method according to an embodiment of this application. The method includes the following operations.

S401. A PCF network element determines to use a same transmission path as a second service data flow for a first service data flow.

In some embodiments, the second service data flow may be an existing service data flow (or may be understood as a service data flow that is being transmitted or a service data flow whose transmission path has been determined). Subsequently, it may be controlled to transmit the first service data flow through a transmission path same as a current transmission path of the second service data flow.

In some embodiments, the second service data flow may alternatively be a service data flow that is not being transmitted or whose transmission path has not been determined. Subsequently, a same transmission path may be set for the first service data flow and the second service data flow; or a transmission path is selected for one of the first service data flow or the second service data flow first, and the other service data flow is specified to follow the transmission path, or the like. This is not specifically limited in this embodiment of this application.

In this embodiment of this application, the PCF network element may determine, based on one or more of a local policy, indication information of an AF network element, or information reported by a UPF network element, to use a same transmission path as the second service data flow for the first service data flow. This is not specifically limited in this embodiment of this application.

S402. The PCF network element indicates an SMF network element to transmit the first service data flow and the second service data flow through a same transmission path.

In this embodiment of this application, indication information indicating to transmit the first service data flow and the second service data flow through a same transmission path may be referred to as first indication information. When the first indication information is transmitted between different network elements, forms and content of the first indication information may be different or may be the same. The first indication information in this embodiment of this application is for describing a function of the first indication information, and a form of the first indication information is not limited. For example, in subsequent embodiments, the PCF network element may send the first indication information to the SMF network element, the SMF network element may send the first indication information to the UPF network element, the SMF network element may send the first indication information to UE, or the like. Forms and content of the first indication information between different network elements may be the same or may be different.

In an MA PDU session establishment or modification procedure, the PCF network element may send, to the SMF network element, the first indication information indicating to transmit the first service data flow and the second service data flow through a same transmission path.

In some embodiments, the first indication information may be included in policy information (or referred to as a policy message or the like). For example, the PCF network element may send a session policy control update notification message Npcf_SMPolicyControl_UpdateNotify message to the SMF network element, and the session policy control update notification message may carry the first indication information. In some embodiments, the Npcf_SMPolicyControl_UpdateNotify message may further carry DNN information.

In some embodiments, the first indication information indicates to transmit the first service data flow in a preset transmission mode, and in the preset transmission mode, the first service data flow and the second service data flow are transmitted through a same transmission path. For example, the first indication information may be ATSSS policy control information (an ATSSS policy, for example, information whose information name is "Steering mode (UL/DL)" in a policy control and charging (PCC) rule) in the PCC rule. In a possible understanding, in this embodiment, the first indication information indicates a new transmission mode. In the new transmission mode, the first service data flow and the second service data flow are transmitted through a same transmission path. For example, the first service data flow may follow a steering mode (or a transmission path) of the second service data flow, or a same steering mode (or a transmission path) may be configured for the first service data flow and the second service data flow.

In some embodiments, the first indication information includes identification information of the first service data flow and identification information of the second service data flow. In a possible understanding, when the first indication information includes identification information of a plurality of service data flows, it may implicitly indicate that the plurality of service data flows are transmitted through a same transmission path.

In some embodiments, the PCF network element may send the first indication information, identification information of the first service data flow, and identification information of the second service data flow to the SMF network element. The first indication information, the identification information of the first service data flow, and the identification information of the second service data flow may be carried in a same message for synchronous or asynchronous sending, or may be carried in different messages for synchronous or asynchronous sending. This is not specifically limited in this embodiment of this application. The first indication information may be a character, a character string, a number, or an identifier of the preset transmission mode that is for indication, or the like. In a possible understanding, this embodiment may indicate that the first service data flow and the second service data flow are transmitted through a same transmission path.

In some embodiments, the PCF network element may send the first indication information, identification information of the first service data flow, identification information of the second service data flow, and a transmission mode of the second service data flow to the SMF network element. The first indication information, the identification information of the first service data flow, the identification information of the second service data flow, and the transmission mode of the second service data flow may be carried in a same message for synchronous or asynchronous sending, or may be carried in different messages for synchronous or asynchronous sending. This is not specifically limited in this embodiment of this application. The first indication information may be a character, a character string, a number, an identifier of the preset transmission mode that is for indication, or the like. In a possible understanding, this embodiment may indicate that the first service data flow and the second service data flow are transmitted through a same transmission path, and indicate the transmission mode of the second service data flow. In this case, the first service data flow may follow the transmission mode of the second service data flow.

In some embodiments, the PCF network element may send, to the SMF network element, the first indication information, identification information of the first service data flow, identification information of the second service data flow, and a transmission mode used by both the first service data flow and the second service data flow. The first indication information, the identification information of the first service data flow, the identification information of the second service data flow, and the transmission mode used by both the first service data flow and the second service data flow may be carried in a same message for synchronous or asynchronous sending, or may be carried in different messages for synchronous or asynchronous sending. This is not specifically limited in this embodiment of this application. The first indication information may be a character, a character string, or a number that is for indication, or the like. In a possible understanding, this embodiment may indicate that the first service data flow and the second service data flow are transmitted through a same transmission path, and indicates the transmission mode used by both the first service data flow and the second service data flow. In this case, the first service data flow and the second service data flow may be transmitted through a same transmission path based on the transmission mode.

In some embodiments, the SMF network element may further feed back a response to the PCF network element, to notify the PCF network element that an indication is received.

In some embodiments, there may be no PCF network element deployed in a core network, and the foregoing functions of the PCF network element may be disposed in the SMF network element or another network element for controlling. In this case, the network element for controlling may implement the solution of determining to use a same transmission path as the second service data flow for the first service data flow in S401, and indication information between adaptive network elements may also be sent and received depending on a corresponding execution network element. For example, if the network element for controlling is the SMF network element, the SMF network element determines to use a same transmission path as the second service data flow for the first service data flow. Step S402 and the operation of feeding back a response by the SMF network element to the PCF network element may be omitted. Details are not described herein again.

S403. The SMF network element indicates the UPF network element to transmit the first service data flow and the second service data flow through a same transmission path.

In this embodiment of this application, the SMF network element may indicate the UPF network element to transmit the first service data flow and the second service data flow through a same transmission path in any indication manner. This is not specifically limited in this embodiment of this application.

In some embodiments, the SMF network element may send, to the UPF via an N4 message or the like, information indicating to transmit the first service data flow and the second service data flow through a same transmission path. For example, the SMF network element may send, via a User Plane Reconfiguration message, information indicating to transmit the first service data flow through a same transmission path as the second service data flow.

For example, the SMF network element receives a PCC rule from the PCF network element. The PCC rule carries ATSSS policy control information indicating to transmit the first service data flow and the second service data flow through a same transmission path. The SMF network element may map a new ATSSS rule. For example, the SMF network element may map the PCC rule to a data packet detection rule (PDR) parameter and a multi-access rule (MAR) parameter in corresponding N4 session management. The PDR parameter may include a Packet Filter Set, for identifying information (for example, a 5-tuple or a source/destination MAC address) about a service data flow by the UPF network element. The MAR parameter may include a steering mode, for notifying the UPF network element of how to steer data of a service data flow over two transmission paths. The SMF network element delivers the foregoing parameters to the UPF network element, so that the UPF network element selects a same steering mode for data of the first service data flow and data of the second service data flow when identifying that the data of the first service data flow and the data of the second service data flow need to be sent.

In some embodiments, the UPF network element may further feed back a response to the SMF network element, to notify the SMF network element that an indication is received.

S404. The SMF network element indicates the UE to transmit the first service data flow and the second service data flow through a same transmission path.

In this embodiment of this application, the SMF network element may indicate the UE to transmit the first service data flow and the second service data flow through a same transmission path in any indication manner. This is not specifically limited in this embodiment of this application.

In some embodiments, the SMF network element may put, into an N1 container, an ATSSS rule including the first indication information, and send the N1 container to an AMF network element via a Namf_Communication_N1N2MessageTransfer message. Information in the N1 container is sent to the UE via the AMF network element. For example, the AMF network element may put the information in the N1 container into a non-access stratum (NAS) message, and send, to a (R)AN, the NAS message including the first indication information. The (R)AN forwards the NAS message to the UE.

In some embodiments, the AMF network element may further feed back a response to the SMF network element, to notify the SMF network element that an indication is received.

After receiving the ATSSS rule including the first indication information, the UE may learn that the first service data flow needs to be transmitted through a same transmission path as the second service data flow.

In some embodiments, the UE may send a NAS message to the RAN, where the NAS message includes a response message indicating that the UE has received the first indication information; and the RAN forwards the NAS message to the AMF network element, where the NAS message includes the response message.

In some embodiments, in operations S401 to S404, the UE and the UPF network element separately learn of service data flows that need to be transmitted through a same transmission path. For subsequently sending data of service data flows, the UE or the UPF network element may select a same transmission path for service data flows that need to be transmitted through a same transmission path.

Figures 5, 6:
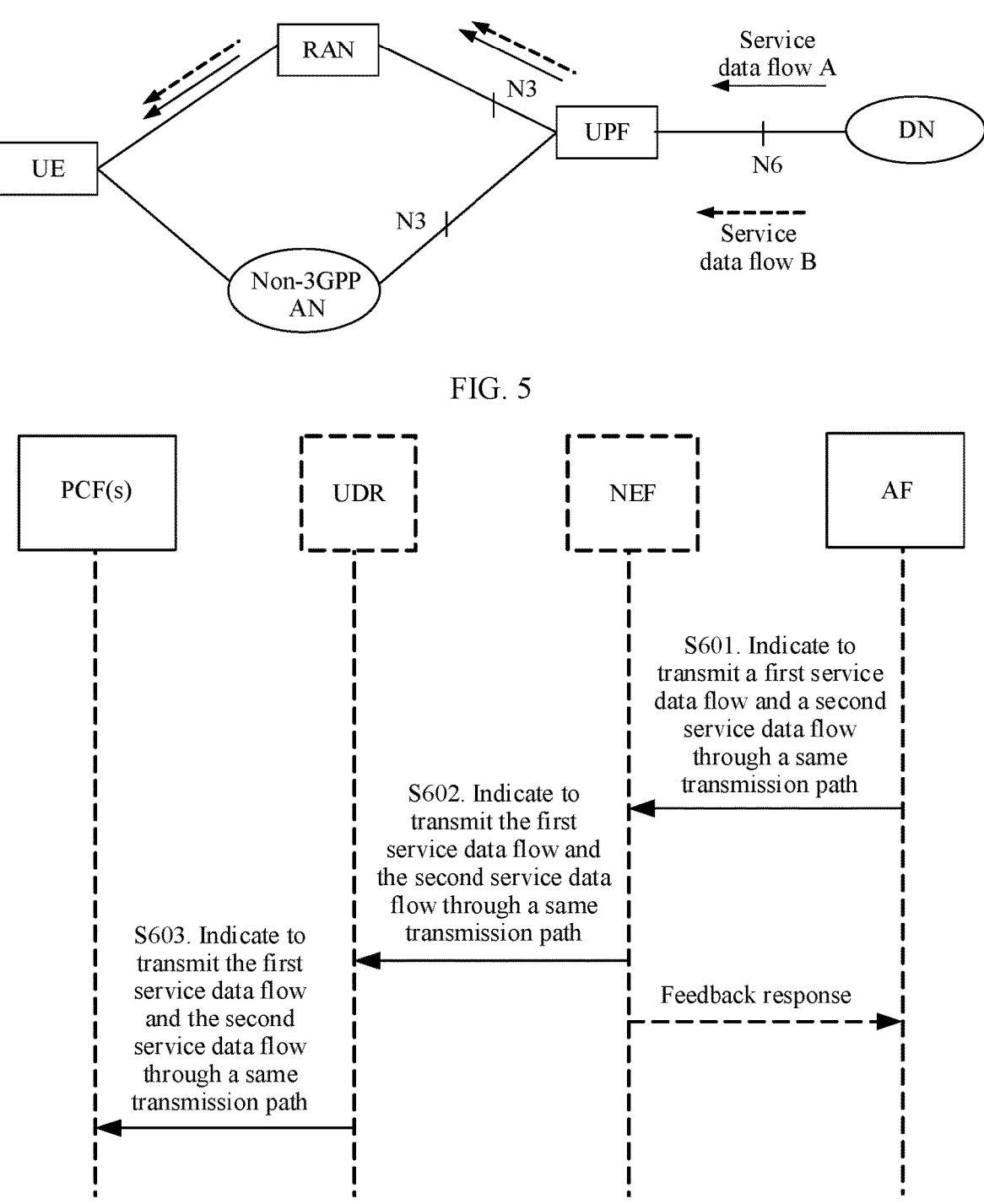
FIG. 5 is a schematic diagram of a data transmission process according to an embodiment of this application.
FIG. 6 is a schematic flowchart of a communication method according to an embodiment of this application.

For example, FIG. 5 is a schematic diagram in which a UPF network element transmits, to UE, a service data flow A and a service data flow B that need to be transmitted through a same transmission path.

As shown in FIG. 5, the UPF network element may select a same transmission path for the service data flow A and the service data flow B, and transmit the service data flow A and the service data flow B to the UE through the transmission path.

A principle for sending data to the UPF network element by the UE is similar to that used for sending data to the UE by the UPF network element. Details are not described herein.

In conclusion, in this embodiment of this application, it may indicate that the first service data flow and the second service data flow are transmitted through a same transmission path. When the first service data flow and the second service data flow are a video interface service data flow and a voice service data flow in a video, the first service data flow and the second service data flow may be transmitted through a same path, to resolve a problem that a video interface is asynchronous with a voice.

In some embodiments, the PCF network element may determine, based on an indication of the AF network element, that the first service data flow and the second service data flow are transmitted through a same transmission path.

For example, the AF network element may determine the first service data flow and the second service data flow that need to be associatively transmitted.

In some embodiments, the AF network element may directly send a request message to the PCF network element, where the request message includes information indicating that the first service data flow and the second service data flow are transmitted through a same transmission path. For example, the request message may include identification information of a plurality of service data flows and binding indication information, to indicate to the PCF network element that the first service data flow and the second service data flow are transmitted through a same transmission path.

In some embodiments, the AF network element may notify, via a NEF network element, the PCF network element that the first service data flow and the second service data flow are transmitted through a same transmission path.

For example, FIG. 6 is a schematic flowchart of a method for indicating a PCF network element by an AF network element via a NEF network element according to an embodiment of this application. The method includes the following operations.

S601. The AF network element indicates the NEF network element to transmit a first service data flow and a second service data flow through a same transmission path.

In some embodiments, the AF network element may create an AF request. The AF request may include information (for example, identification information of the first service data flow and identification information of the second service data flow) about service data flows that need to be associated and a binding indication. For example, if the service data flow is an IP data packet, the information about the service data flow may be 5-tuple information or the like; if the service data flow is an Ethernet data packet, the information about the service data flow may be a source MAC address, a destination MAC address, an Ethernet type EtherType, or the like. The binding indication may be a character string (for example, "Binding"), to explicitly indicate that the service data flows need to be bound together. The binding indication may alternatively be a Boolean variable named Binding Indication. For example, when a value of the variable is 1, the service data flows are bound; when a value of the variable is 0, the service data flows are bound, or the like.

The AF network element may send the AF request to the NEF via an Nnef_TrafficInfluence_Create Request or Nnef_TrafficInfluence_Update Request message.

In some embodiments, the message sent by the AF network element may further carry one or more the following parameters: an AF transaction ID, an AF service identifier, a combination of a data network name (DNN) and single network slice selection assistance information (S-NS-SAI), an identifier (GPSI) of target UE, and the like. This facilitates the NEF to identify an external service marker.

S602. The NEF network element indicates a unified data repository (UDR) function network element to transmit the first service data flow and the second service data flow through a same transmission path.

In some embodiments, after receiving the AF request from the AF network element, the NEF network element may map some information in the AF request to information required by a 5GC (5G core network), for example, map the AF-Service-Identifier (application layer function service identifier) to the combination of the DNN and the S-NSSAI, or map the identifier (GPSI) of the target UE to an SUPI of the target UE.

The NEF network element stores the information in the AF request in the UDR network element. For example, the NEF network element stores the information in the AF request in a data set named Application Data and a data subset named "AF traffic influence request information". The stored information may include the AF transaction ID, the S-NSSAI and the DNN, or an SUPI of the UE.

In some embodiments, the NEF network element may feed back, to the AF network element via an Nnef_TrafficInfluence_Create Response or Nnef_TrafficInfluence_Update Response message, a response indicating an execution result (for example, success or failure; and if the execution result is failure, a failure cause may be further indicated).

S603. The UDR network element indicates a PCF network element to transmit the first service data flow and the second service data flow through a same transmission path.

In some embodiments, the UDR network element may notify, via an Nudr_DM_Notify message, the PCF network element that the data stored in the UDR is updated. The Nudr_DM_Notify message may carry a Data Set Identifier, a Data Subset Identifier, and updated data content, so that the PCF network element can learn where the data changes. The updated data content may include the information about the service data flows that need to be associated and the binding indication.

Therefore, the PCF network element may determine whether to update a session policy for the first service data flow and the second service data flow, and perform policy decision, to perform the manner in the embodiment corresponding to FIG. 4. Details are not described herein again.

In this way, the PCF network element may determine, based on an indication of the AF network element, to use a same transmission path as the second service data flow for the first service data flow.

In some embodiments, the PCF network element may determine, based on information reported by a UPF network element, that the first service data flow and the second service data flow are transmitted through a same transmission path.

Figure 7:
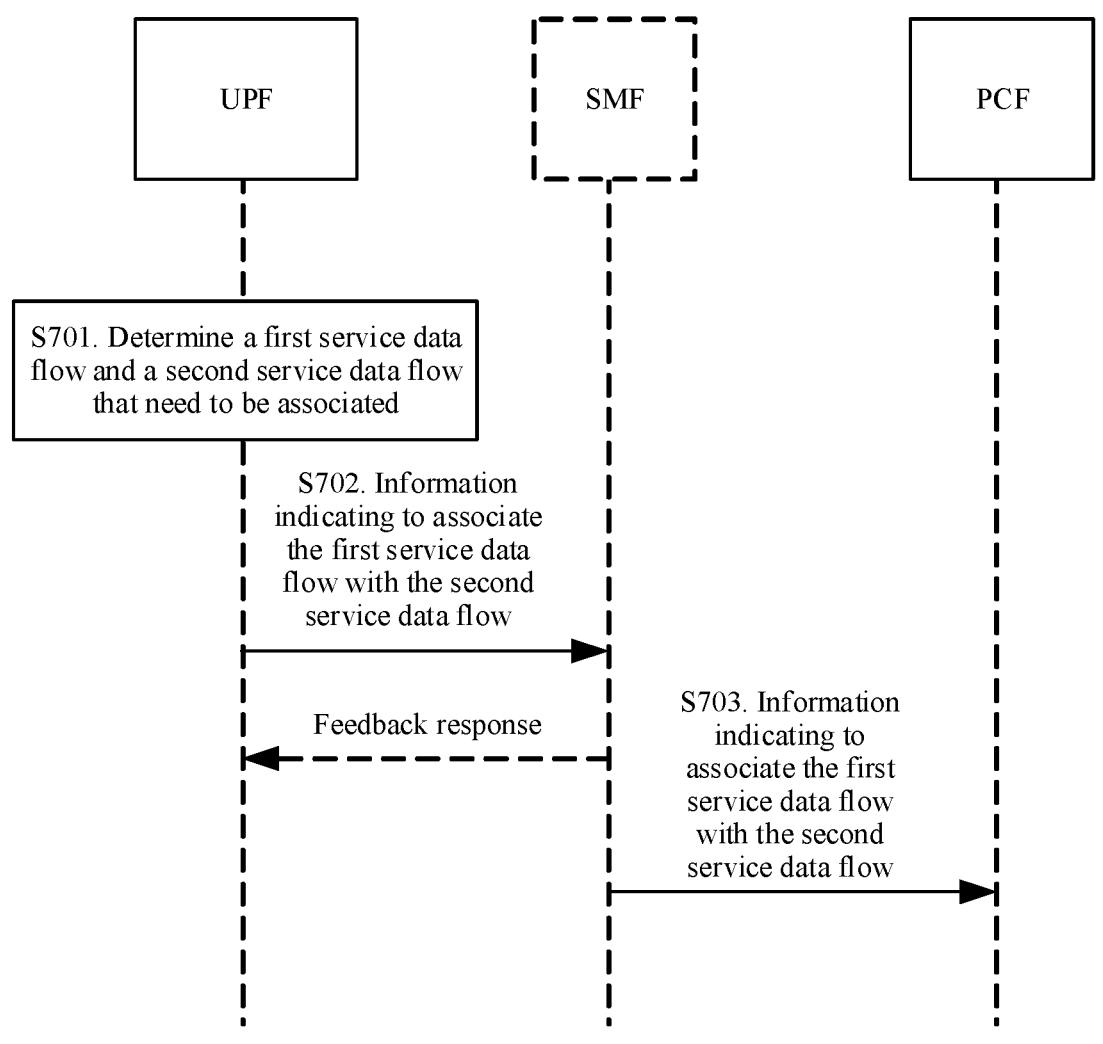
FIG. 7 is a schematic flowchart of a communication method according to an embodiment of this application.

For example, FIG. 7 is a schematic flowchart of a communication method between a UPF network element and a PCF network element according to an embodiment of this application. The method includes the following operations.

S701. The UPF network element determines a first service data flow and a second service data flow that need to be associated.

In some embodiments, the UPF network element may determine, based on destination addresses of the first service data flow and the second service data flow, the first service data flow and the second service data flow that need to be associated.

For example, the UPF network element detects that some different service data flows (for example, the first service data flow and the second service data flow) always need to be sent to a same destination peer end at the same time. For example, destination IP addresses or destination MAC addresses of the first service data flow and the second service data flow are consistent, or both destination IP addresses point to same UE for identification. The UPF network element may determine the first service data flow and the second service data flow that need to be associated.

S702. The UPF network element sends, to an SMF network element, information indicating to associate the first service data flow with the second service data flow.

For example, the UPF network element may send identification information of the first service data flow and identification information of the second service data flow to the SMF network element via N4 session report information, or send identification information of the first service data flow, identification information of the second service data flow, and an association indication (or referred to as a binding indication). The association indication indicates that there is an association relationship (or referred to as a binding relationship) between these service data flows.

In some embodiments, the SMF network element may further send, to the UPF network element, a feedback response notifying that the information indicating to associate the first service data flow with the second service data flow has been received.

S703. The SMF network element sends, to a PCF network element, the information indicating to associate the first service data flow with the second service data flow.

For example, the SMF network element sends the identification information of the first service data flow and the identification information of the second service data flow to the PCF network element via an Npcf_SMPolicyContro-l_Update Request message, or sends the identification information of the first service data flow, the identification information of the second service data flow, and the association indication (or referred to as the binding indication). The association indication indicates that an association relationship (or referred to as a binding relationship) between these service data flows.

Therefore, the PCF network element may determine whether to update the session policy for the first service data flow and the second service data flow, and perform policy decision, to perform the manner in the embodiment corresponding to FIG. 4. Details are not described herein again.

In this way, the PCF network element may determine, based on an indication of the UPF network element, to use a same transmission path as the second service data flow for the first service data flow.

In a transmission mode in a related technology, in data transmission of a service data flow, for some service data flows sensitive to a packet loss rate, a transmission path with a lower packet loss rate is preferred in the transmission mode in the related technology, and even a network is expected to maximally meet the data flows' requirements for the packet loss rate. However, the network cannot be improved along with user requirements, prone to resulting in a high packet loss rate.

Based on this, in this embodiment of this application, a requirement (for example, a packet loss rate threshold) of a service data flow for a packet loss rate can be learned of. For example, UE or the UPF network element may monitor packet loss rates of a plurality of transmission paths in real time. If there are transmission paths with packet loss rates less than the packet loss rate threshold, the UE or the UPF network element may select a transmission path with a lowest packet loss rate for transmission. If the packet loss rates of the plurality of transmission paths are all greater than the threshold, when sending data of the service data flow, the UE or the UPF network element may duplicate the data, and redundantly transmit the data through the plurality of transmission paths separately, to further decrease the packet loss rate of the service data flow data. When there are transmission paths with packet loss rates recovering to be less than the packet loss rate threshold, the UE or the UPF network element may dynamically select a transmission path with a lowest packet loss rate to transmit the data of the service data flow.

A first transmission mode in this embodiment of this application may be referred to as a dynamic redundant transmission mode.

For example, Table 2 schematically lists a possible first transmission mode. The first transmission mode may be referred to as a redundant transmission steering mode, or the like.

TABLE 2

| Service data flow | Steering mode |
|---|---|
| SDF 1 | Redundant transmission steering mode (THR of PLR) |

For the first service data flow SDF 1, in the first transmission mode, when there is a transmission path with a packet loss rate less than the packet loss rate threshold in the plurality of transmission paths, the first service data flow is transmitted through the transmission path with a packet loss rate less than the packet loss rate threshold in the plurality of transmission paths; or when packet loss rates of the plurality of transmission paths are all greater than the packet loss rate threshold, the first service data flow is redundantly transmitted through the plurality of transmission paths. When there is a transmission path with a packet loss rate equal to the packet loss rate threshold in the plurality of transmission paths, the first service data flow may be transmitted through the transmission path with a packet loss rate equal to the packet loss rate threshold in the plurality of transmission paths, or the first service data flow may be redundantly transmitted through the plurality of transmission paths. This is not specifically limited in this embodiment of this application.

By using embodiments, the following describes in detail the technical solutions of this application and how to resolve the foregoing technical problem using the technical solutions of this application. The following several embodiments may be implemented independently or combined with each other, and same or similar concepts or processes may not be repeatedly described in some embodiments.

Figure 8:
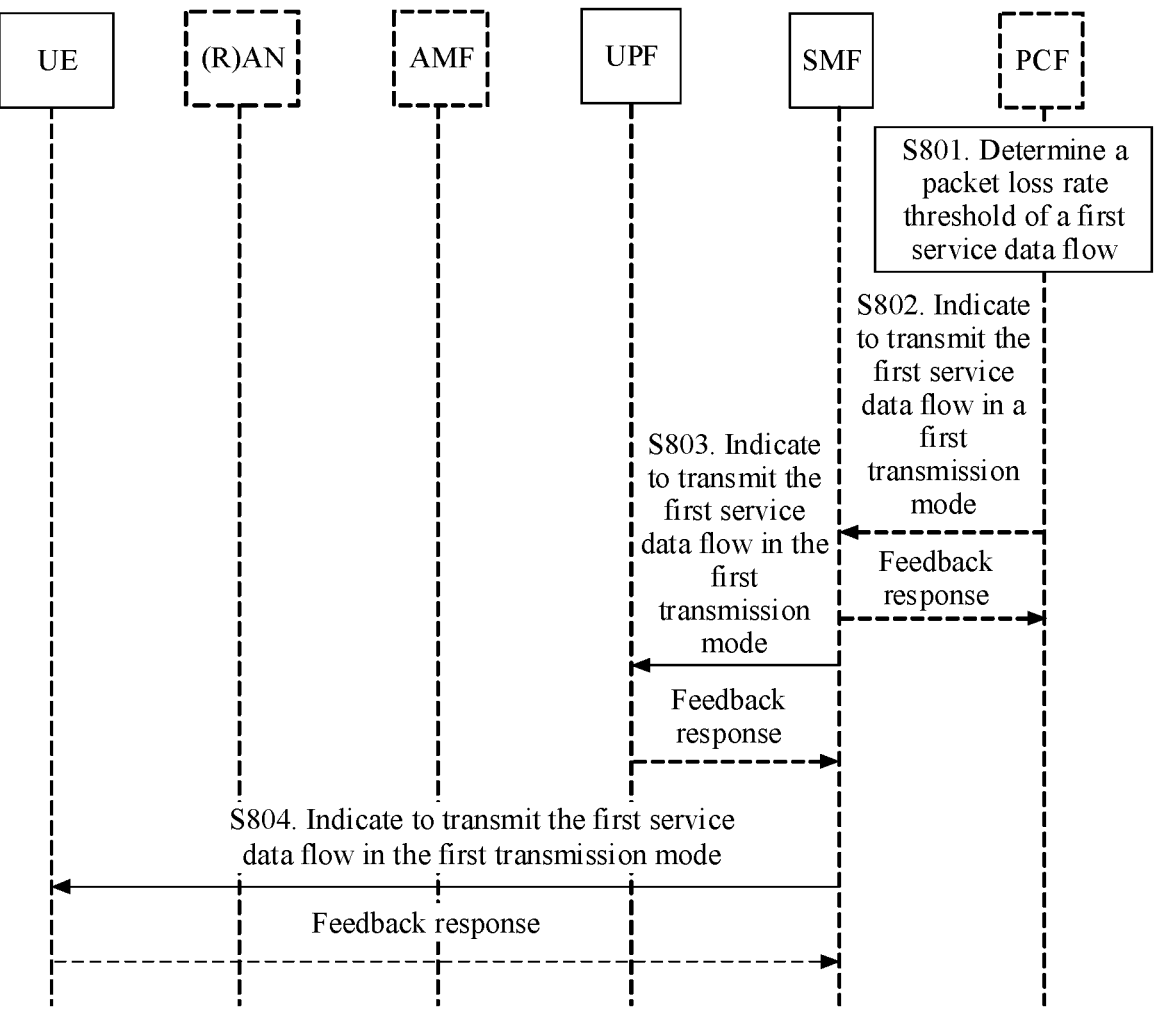
FIG. 8 is a schematic flowchart of a communication method according to an embodiment of this application.

FIG. 8 is a schematic flowchart of a communication method according to an embodiment of this application. The method includes the following operations.

S801. A PCF network element determines a packet loss rate threshold of a first service data flow.

In some embodiments, the first service data flow may be an existing service data flow (or may be understood as a service data flow that is being transmitted or a service data flow whose transmission path has been determined).

In some embodiments, the first service data flow may be a service data flow that is not being transmitted or whose transmission path has not been determined.

In an embodiment of this application, the PCF network element may determine, based on one or more of a local policy, indication information of an AF network element, or information reported by a UPF network element, the packet loss rate threshold of the first service data flow. This is not specifically limited in this embodiment of this application.

S802. The PCF network element indicates an SMF network element to transmit the first service data flow in a first transmission mode.

In an embodiment of this application, information indicating to transmit the first service data flow in the first transmission mode may be referred to as first information. When the first information is transmitted between different network elements, forms and content of the first information may be different or may be the same. The first information in this embodiment of this application is for describing a function of the first information, and a form of the first information is not limited. For example, in subsequent embodiments, the PCF network element may send the first information to the SMF network element, the SMF network element may send the first information to the UPF network element, the SMF network element may send the first information to UE, or the like. Forms and content of the first information between different network elements may be the same or may be different.

In an MA PDU session establishment or modification procedure, the PCF network element may send, to the SMF network element, the first information indicating to transmit the first service data flow in the first transmission mode.

In some embodiments, the first information may be included in policy information (or referred to as a policy message or the like). For example, the PCF network element may send a session policy control update notification message Npcf_SMPolicyControl_UpdateNotify message to the SMF network element, and the session policy control update notification message may carry the first information. In some embodiments, the Npcf_SMPolicyControl_UpdateNotify message may further carry DNN information.

In some embodiments, the first information indicates to transmit the first service data flow in the first transmission mode. For example, the first information may be ATSSS policy control information (for example, information whose information name is "Steering mode (UL/DL)" in a policy control and charging (PCC) rule) in the PCC rule. In some embodiments, the first information indicates a new transmission mode, and in the new transmission mode, the first service data flow uses a dynamic redundant transmission mode.

In some embodiments, the first information includes identification information of the first service data flow and the packet loss rate threshold of the first service data flow. The identification information of the first service data flow and the packet loss rate threshold of the first service data flow may be carried in a same message for synchronous or asynchronous sending, or may be carried in different messages for synchronous or asynchronous sending. This is not specifically limited in this embodiment of this application. The first information may be a character, a character string, or a number that is for indication, or the like, which may indicate that the first service data flow is transmitted in the first transmission mode.

In some embodiments, the PCF network element may send the first information, the identification information of the first service data flow, and the packet loss rate threshold of the first service data flow to the SMF network element. The first information, the identification information of the first service data flow, and the packet loss rate threshold of the first service data flow may be carried in a same message for synchronous or asynchronous sending, or may be carried in different messages for synchronous or asynchronous sending. This is not specifically limited in this embodiment of this application. The first information may be a character, a character string, a number, an identifier of the first transmission mode that is for indication, or the like, which may indicate that the first service data flow is transmitted in the first transmission mode.

In some embodiments, the SMF network element may further feed back a response to the PCF network element, to notify the PCF network element that an indication is received.

In some embodiments, there may be no PCF network element deployed in a core network, and the foregoing functions of the PCF network element may be disposed in the SMF network element or another network element for controlling. In this case, the network element for controlling may implement the solution of determining the packet loss rate threshold of the first service data flow in S801, and indication information between adaptive network elements may also be sent and received depending on a corresponding execution network element. For example, if the network element for controlling is the SMF network element, the SMF network element determines the packet loss rate threshold of the first service data flow. Step S802 and the operation of feeding back a response by the SMF network element to the PCF network element may be omitted. Details are not described herein again.

S803. The SMF network element indicates the UPF network element to transmit the first service data flow in the first transmission mode.

In an embodiment of this application, the SMF network element may indicate the UPF network element to transmit the first service data flow in the first transmission mode in any indication manner. This is not specifically limited in this embodiment of this application.

In some embodiments, the SMF network element may send, to the UPF via an N4 message or the like, information indicating to transmit the first service data flow in the first transmission mode. For example, the SMF network element may send, via a User Plane Reconfiguration message, information indicating to transmit the first service data flow in the first transmission mode.

For example, the SMF network element receives a PCC rule from the PCF network element. The PCC rule carries ATSSS policy control information indicating to transmit the first service data flow in the first transmission mode. The SMF network element may map a new ATSSS rule. For example, the SMF network element may map the PCC rule to a data packet detection rule (PDR) parameter and a multi-access rule (MAR) parameter in corresponding N4 session management. The PDR parameter may include a Packet Filter Set, for identifying information (for example, a 5-tuple or a source/destination MAC address) about a service data flow by the UPF network element. The MAR parameter may include a steering mode, for notifying the UPF network element of how to steer data of a service data flow over two transmission paths. The SMF network element delivers the foregoing parameters to the UPF network element, so that the UPF network element transmits data of the first service data flow in the first transmission mode when identifying that the data of the first service data flow needs to be sent.

In some embodiments, the SMF network element may further deliver an indication to the UPF network element, to notify the UPF that a packet loss rate of a transmission path needs to be monitored in real time, so that the UPF network element can dynamically and redundantly transmit the data of the first service data flow.

In some embodiments, the UPF network element may further feed back a response to the SMF network element, to notify the SMF network element that an indication is received.

S804. The SMF network element indicates the UE to transmit the first service data flow in the first transmission mode.

In an embodiment of this application, the SMF network element may indicate the UE to transmit the first service data flow in the first transmission mode in any indication manner. This is not specifically limited in this embodiment of this application.

In some embodiments, the SMF network element may put, into an N1 container, an ATSSS rule including the first information, and send the N1 container to an AMF network element via a Namf_Communication_ N1N2Message Transfer message. Information in the N1 container is sent to the UE via the AMF network element. For example, the AMF network element may put information in the N1 container into a non-access stratum (NAS) message, and send, to a (R)AN, the NAS message including the first information. The (R)AN forwards the NAS message to the UE.

In some embodiments, the AMF network element may further feed back a response to the SMF network element, to notify the SMF network element that an indication is received.

After receiving the ATSSS rule including the first information, the UE may learn that the first service data flow is transmitted in the first transmission mode.

In some embodiments, the UE may send a NAS message to the RAN, where the NAS message includes a response message indicating that the UE has received the first information; and the RAN forwards the NAS message to the AMF network element, where the NAS message includes the response message.

In some embodiments, when the UE needs to send the data of the first service data flow, packet loss rates of the two transmission paths may be monitored in real time, and the data is transmitted in a dynamic redundant transmission steering mode.

In some embodiments, in operations S801 to S804, the UE and the UPF network element separately learn that the first service data flow is transmitted in the first transmission mode. For subsequently sending data of service data flows, the UE or the UPF network element may transmit the data in the dynamic redundant transmission steering mode.

Figure 9:
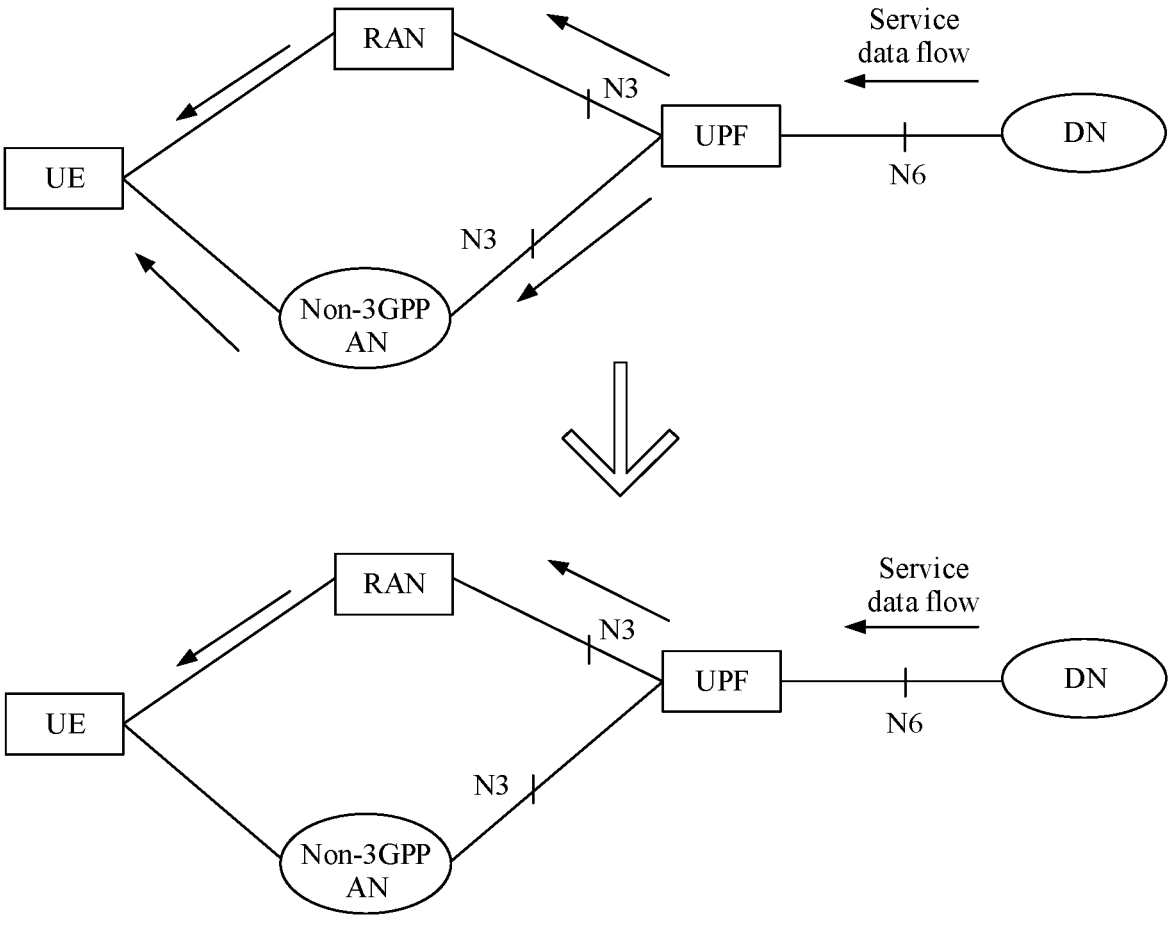
FIG. 9 is a schematic diagram of a data transmission process according to an embodiment of this application.

For example, FIG. 9 is a schematic diagram in which a UPF network element transmits a service data flow to UE in a first steering mode.

As shown in FIG. 9, the UPF network element may monitor packet loss rates of two transmission paths in real time. When the UPF network element needs to send data of a service data flow, the UPF network element first determines whether there is a transmission path with a packet loss rate lower than a requirement of the service data flow for a packet loss rate. If there is a transmission path with a packet loss rate lower than the requirement of the service data flow for a packet loss rate, the UPF network element selects the transmission path with the low packet loss rate for transmission. If there is no transmission path with a packet loss rate lower than the requirement of the service data flow for a packet loss rate, the UPF network element duplicates the data of the service data flow and separately transmits the data through the two transmission paths, to decrease a packet loss rate of the service data flow. If there is a transmission path with a packet loss rate recovering to be lower than a packet loss rate threshold subsequently, the UPF network element may select the transmission path with the packet loss rate lower than the packet loss rate threshold for transmission. In this case, the UPF network element may not need to duplicate the data and may not need to transmit the data through the two transmission paths, to save network resources.

It may be understood that, if the UPF network element selects the transmission path with the packet loss rate lower than the packet loss rate threshold for transmission, but subsequently detects that all packet loss rates of transmission paths are higher than the packet loss rate threshold, the UPF network element may duplicate the data of the service data flow and separately transmit the data of the service data flow through the two transmission paths, to implement dynamic redundant transmission. Details are not described herein.

A principle for sending data to the UPF network element by the UE is similar to that used for sending data to the UE by the UPF network element. Details are not described herein.

In conclusion, in this embodiment of this application, a redundant transmission steering mode may be dynamically selected for the service data flow. When packet loss rates of a plurality of transmission paths do not meet the requirement, the data of the service data flow is duplicated, and separately transmitted (or understood as redundantly transmitted) through the plurality of transmission paths, to decrease the packet loss rate. In addition, when there is the transmission path with the packet loss rate recovering to be lower than the packet loss rate threshold, the data is transmitted through the transmission path with the low packet loss rate, to save network-side resources. Alternatively, in a possible understanding, in this embodiment of this application, redundant transmission is not always maintained. Instead, by monitoring a network status, the redundant transmission is started only when all of the plurality of transmission paths does not meet the requirement for the packet loss rate. In addition, when there is a transmission path recovering to meet the requirement for the packet loss rate, the redundant transmission is stopped, and the path with the low packet loss rate is selected for transmission.

In some embodiments, the PCF network element may determine the packet loss rate threshold of the first service data flow based on an indication of the AF network element.

For example, the AF network element may determine the packet loss rate threshold of the first service data flow.

In some embodiments, the AF network element may directly send a request message to the PCF network element, where the request message includes information indicating the packet loss rate threshold of the first service data flow. For example, the request message may include the identification information and the packet loss rate threshold of the first service data flow, to indicate the PCF network element to transmit the first service data flow in the first transmission mode.

In some embodiments, the AF network element may notify, via a NEF network element, the PCF network element to transmit the first service data flow in the first transmission mode.

Figure 10:
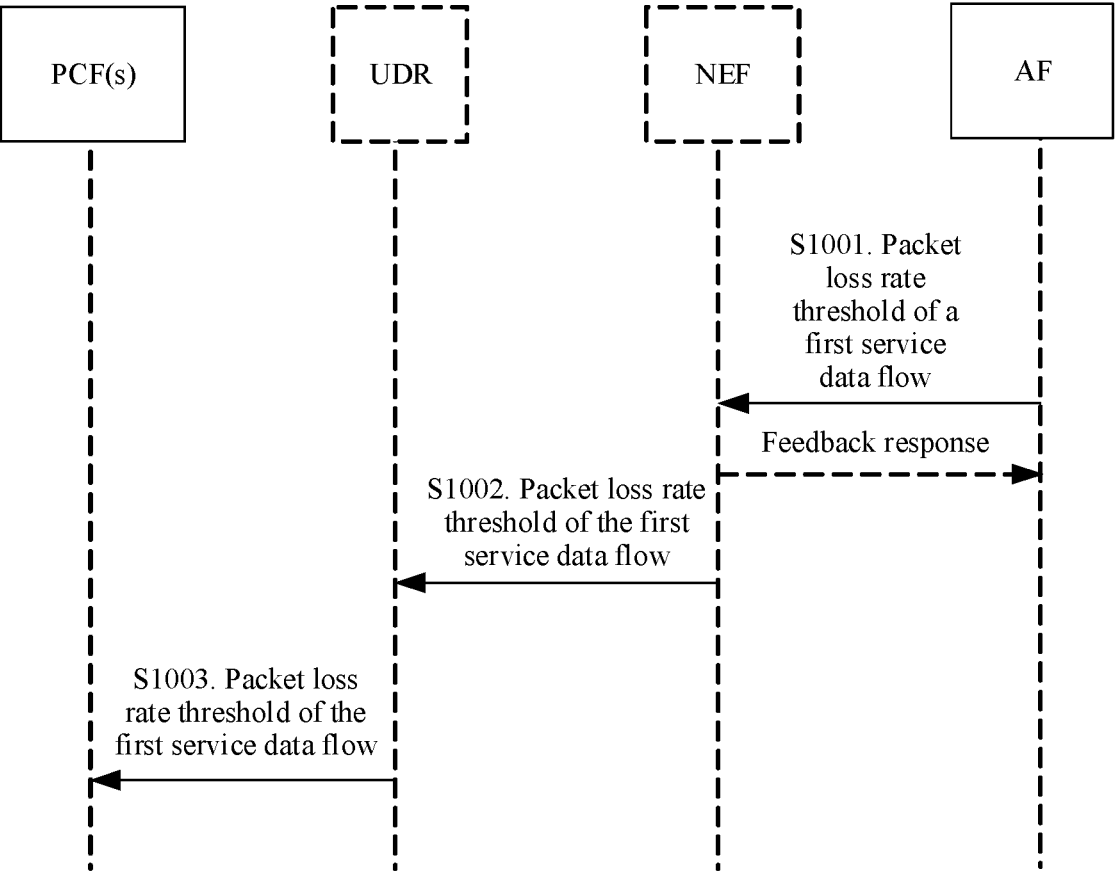
FIG. 10 is a schematic flowchart of a communication method according to an embodiment of this application.

For example, FIG. 10 is a schematic flowchart of a method for indicating a PCF network element by an AF network element via a NEF network element according to an embodiment of this application. The method includes the following operations.

S1001. The AF network element sends a packet loss rate threshold of a first service data flow to the NEF network element.

In some embodiments, the AF network element may create an AF request. The AF request may include identification information (or referred to as information about a service data flow) of the first service data flow and the packet loss rate threshold. For example, if the service data flow is an IP data packet, the information about the service data flow may be 5-tuple information or the like; if the service data flow is an Ethernet data packet, the information about the service data flow may be a source MAC address, a destination MAC address, an Ethernet type EtherType, or the like. The packet loss rate threshold indicates a requirement of the service data flow for a packet loss rate.

The AF network element may send the AF request to the NEF via an Nnef_TrafficInfluence_Create Request or Nnef_TrafficInfluence_Update Request message.

In some embodiments, the message sent by the AF network element may further carry one or more the following parameters: an AF transaction ID, an AF service identifier, a combination of a data network name (DNN) and single network slice selection assistance information (S-NS-SAI), an identifier (GPSI) of target UE, and the like. This facilitates the NEF to identify an external service marker.

S1002. The NEF network element sends the packet loss rate threshold of the first service data flow to a unified data repository (UDR) function network element.

In some embodiments, after receiving the AF request from the AF network element, the NEF network element may map some information in the AF request to information required by a 5GC (5G core network), for example, map the AF-Service-Identifier (application layer function service identifier) to the combination of the DNN and the S-NSSAI, or map the identifier (GPSI) of the target UE to an SUPI of the target UE.

The NEF network element stores the information in the AF request in the UDR network element. For example, the NEF network element stores the information in the AF request in a data set named Application Data and a data subset named "AF traffic influence request information". The stored information may include the AF transaction ID, the S-NSSAI and the DNN, or an SUPI of the UE.

In some embodiments, the NEF network element may feed back, to the AF network element via an Nnef_TrafficInfluence_Create Response or Nnef_TrafficInfluence_Update Response message, a response indicating an execution result (for example, success or failure; and if the execution result is failure, a failure cause may be further indicated).

S1003. The UDR network element sends the packet loss rate threshold of the first service data flow to the PCF network element.

In some embodiments, the UDR network element may notify, via an Nudr_DM_Notify message, the PCF network element that the data stored in the UDR is updated. The Nudr_DM_Notify message may carry a Data Set Identifier, a Data Subset Identifier, and updated data content, so that the PCF network element can learn where the data changes. The updated data content may include the identification information and the packet loss rate threshold of the first service data flow.

Therefore, the PCF network element may determine whether to transmit the first service data flow in a first steering mode, and perform policy decision, to perform the manner in the embodiment corresponding to FIG. 8. Details are not described herein again.

In this way, the PCF network element may determine, based on an indication of the AF network element, to transmit the first service data flow in a first transmission mode.

In some embodiments, the PCF network element may determine, based on information reported by a UPF network element, to transmit the first service data flow in the first transmission mode.

Figure 11:
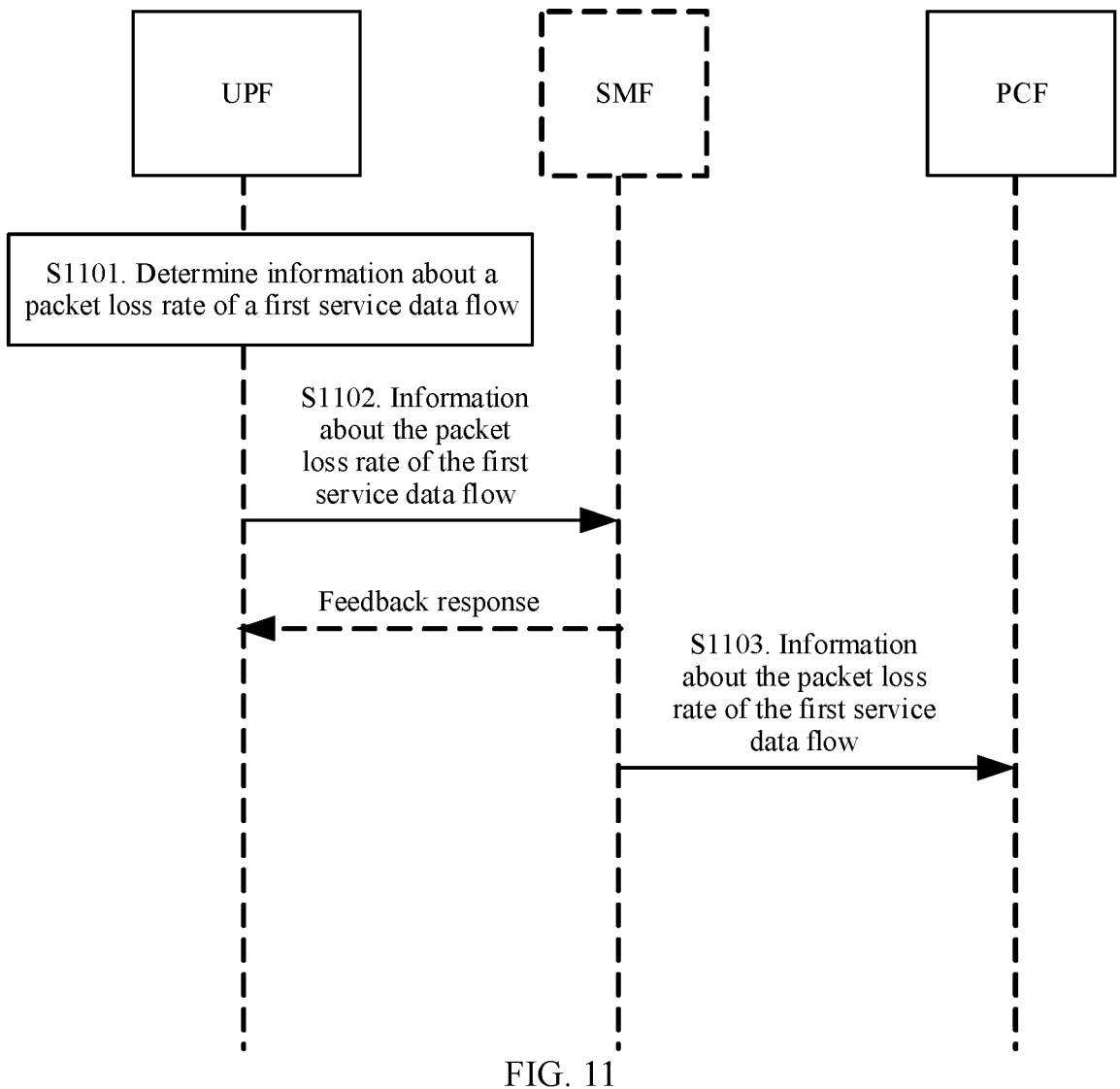
FIG. 11 is a schematic flowchart of a communication method according to an embodiment of this application.

For example, FIG. 11 is a schematic flowchart of a communication method between a UPF network element and a PCF network element according to an embodiment of this application. The method includes the following operations.

S1101. The UPF network element determines information about a packet loss rate of a first service data flow.

In some embodiments, the UPF network element may identify, in a manner of packet capture or the like, that the packet loss rate of the first service data flow is high, an operator often receives a complaint from a user about the first service data flow, or the like. The UPF network element may determine that a packet loss always occurs on the first service data flow.

The information about the packet loss rate of the first service data flow may be: a measurement value of the packet loss rate of the first service data flow; or indication information indicating that the packet loss rate is excessively high, used to indicate that the first service data flow has a high packet loss rate; indication information indicating that the packet loss rate does not meet a maximum packet loss rate provided by QoS; or the like.

S1102. The UPF network element sends the information about the packet loss rate of the first service data flow to an SMF network element.

For example, the UPF network element may send identification information of the first service data flow and the information about the packet loss rate of the first service data flow to the SMF network element via N4 session report (N4 session report) information.

In some embodiments, the SMF network element may further send, to the UPF network element, a feedback response notifying that the information about the packet loss rate of the first service data flow has been received.

S1103. The SMF network element sends the information about the packet loss rate of the first service data flow to a PCF network element.

For example, the SMF network element sends the identification information of the first service data flow and the information about the packet loss rate of the first service data flow to the PCF network element via an Npcf_SMPolicyControl_Update Request message.

Therefore, the PCF network element may determine whether to transmit the first service data flow in a first steering mode, and perform policy decision, to perform the manner in the embodiment corresponding to FIG. 8. Details are not described herein again.

In this way, the PCF network element may determine, based on the information sent by the UPF network element, to transmit the first service data flow in a first transmission mode.

The foregoing describes the methods in embodiments of this application with reference to FIG. 4 to FIG. 11. The following describes a communication apparatus that is provided in embodiments of this application and that performs the foregoing methods. A person skilled in the art may understand that the method and the apparatus may be mutually combined and referenced. A communication apparatus provided in embodiments of this application may perform the operations performed by the control network element in the foregoing communication methods. Another communication apparatus may perform the operations performed by the user plane network element in the communication methods in the foregoing embodiments. Another communication apparatus may perform the operations performed by the session management network element in the communication methods in the foregoing embodiments.

Figure 12:
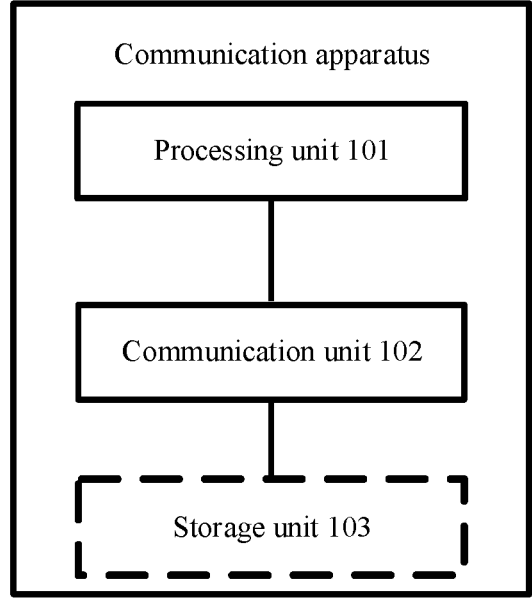
FIG. 12 is a schematic diagram of a structure of a communication apparatus according to an embodiment of this application.

FIG. 12 is a schematic diagram of a structure of a communication apparatus according to an embodiment of this application. The communication apparatus may be an SMF network element, a UPF network element, or a PCF network element in embodiments of this application, or may be a chip used in the SMF network element, the UPF network element, or the PCF network element. The communication apparatus includes a processing unit 101 and a communication unit 102. The communication unit 102 is configured to support the communication apparatus in performing an operation of sending or receiving information. The processing unit 101 is configured to support the communication apparatus in performing an operation of processing information.

In an example, the communication apparatus is a PCF network element or a chip or a chip system used in the PCF network element. The communication unit 102 is configured to support the communication apparatus in performing S402 or S802 in the foregoing embodiments. The processing unit 101 is configured to support the communication apparatus in performing S401 or S801 in the foregoing embodiments.

In another example, the communication apparatus is a UPF network element or a chip or a chip system used in the UPF network element. The communication unit 102 is configured to support the communication apparatus in performing S403 or S803 in the foregoing embodiments.

In still another example, the communication apparatus is an SMF network element or a chip or a chip system used in the SMF network element. The communication unit 102 is configured to support the communication apparatus in performing S402, S403, and S404, or S802, S803, and S804 in the foregoing embodiments.

In a possible embodiment, the communication apparatus may further include a storage unit 103. The processing unit 101, the communication unit 102, and the storage unit 103 are connected through a communication bus.

The storage unit 103 may include one or more memories. The memory may be a component configured to store a program or data in one or more devices or circuits.

The storage unit 103 may exist independently, and is connected to the processing unit 101 of the communication apparatus through the communication bus. The storage unit 103 may alternatively be integrated with the processing unit.

The communication apparatus may be used in a communication device, a circuit, a hardware component, or a chip.

For example, the communication apparatus may be the chip or the chip system used in the SMF network element, the UPF network element, or the PCF network element in embodiments of this application. In this case, the communication unit 102 may be an input or output interface, a pin, a circuit, or the like. For example, the storage unit 103 may store computer-executable instructions of a method on the SMF network element side, the UPF network element side, or the PCF network element side, so that the processing unit 101 performs the method on the SMF network element side, the UPF network element side, or the PCF network element side in the foregoing embodiments. The storage unit 103 may be a register, a cache, a RAM, or the like. The storage unit 103 may be integrated with the processing unit 101. The storage unit 103 may be a ROM or another type of static storage device that can store static information and instructions, and the storage unit 103 may be independent of the processing unit 101.

An embodiment of this application provides a communication apparatus. The communication apparatus includes one or more modules, configured to implement the method in S401 to S404. The one or more modules may correspond to the operations in the method in S401 to S404. Specifically, for each operation in a method performed by an SMF network element in embodiments of this application, the SMF network element includes a unit or module for performing each operation in the method. For each operation in a method performed by a UPF network element, the UPF network element includes a unit or module for performing each operation in the method. For each operation in a method performed by a PCF network element, the PCF network element includes a unit or module for performing each operation in the method. For example, a module that controls or processes an action of the communication apparatus may be referred to as a processing module. A module that performs an operation of processing a message or data on the communication apparatus side may be referred to as a communication module.

Figure 13:
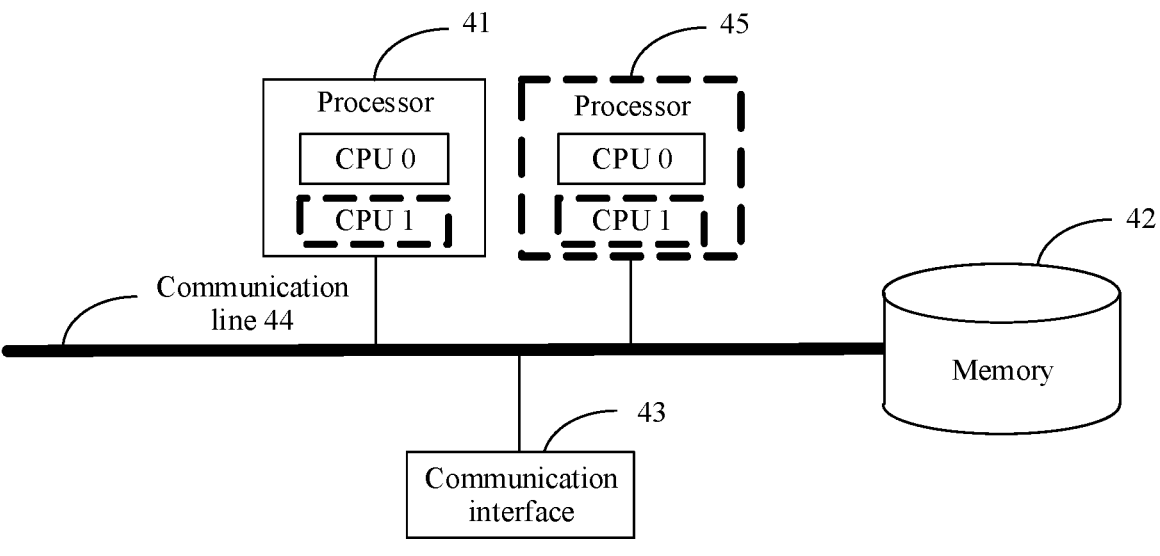
FIG. 13 is a schematic diagram of a structure of a communication device according to an embodiment of this application.

FIG. 13 is a schematic diagram of a hardware structure of a communication device according to an embodiment of this application. For hardware structures of an SMF network element, a UPF network element, and a PCF network element in embodiments of this application, refer to the schematic diagram of the hardware structure of the communication device shown in FIG. 13. The communication device includes a processor 41, a communication line 44, and at least one communication interface (a communication interface 43 is used as an example in FIG. 13 for description).

The processor 41 may be a general-purpose central processing unit (CPU), a microprocessor, an application-specific integrated circuit (ASIC), or one or more integrated circuits configured to control program execution of solutions of this application.

The communication line 44 may include a path transmitting information between the foregoing components.

The communication interface 43 uses any apparatus such as a transceiver, and is configured to communicate with another device or a communication network such as the Ethernet, a radio access network (RAN), or a wireless local area network (WLAN).

Possibly, the communication device may further include a memory 42.

The memory 42 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that is accessible by a computer, but is not limited thereto. The memory may exist independently, and is connected to the processor through the communication line 44. The memory may alternatively be integrated with the processor.

The memory 42 is configured to store computer-executable instructions for performing the solutions in this application, and the processor 41 controls execution. The processor 41 is configured to execute the computer-executable instructions stored in the memory 42, to implement a policy control method provided in the following embodiments of this application.

Possibly, the computer-executable instructions in this embodiment of this application may also be referred to as application program code. This is not specifically limited in this embodiment of this application.

In some embodiments, the processor 41 may include one or more CPUs, for example, a CPU 0 and a CPU 1 in FIG. 13.

In some embodiments, the communication device may include a plurality of processors, for example, the processor 41 and a processor 45 in FIG. 13. Each of the processors may be a single-core (single-CPU) processor, or may be a multicore (multi-CPU) processor. The processor herein may be one or more devices, circuits, and/or processing cores configured to process data (for example, computer program instructions).

In some embodiments, the communication apparatus is an SMF network element or a chip used in the SMF network element. The communication interface is configured to support the communication apparatus in performing S402, S403, and S404, or S802, S803, and S804 in the foregoing embodiments.

In some embodiments, the communication apparatus may be a UPF network element or a chip or a chip system used in the UPF network element. The communication interface is configured to support the communication apparatus in performing S403 or S803 in the foregoing embodiments.

In some embodiments, the communication apparatus may be a PCF network element or a chip or a chip system used in the PCF network element. The communication interface is configured to support the communication apparatus in performing S402 or S802 in the foregoing embodiments. The processor 41 or the processor 45 is configured to support the communication apparatus in performing S401 or S801 in the foregoing embodiments.

Figure 14:
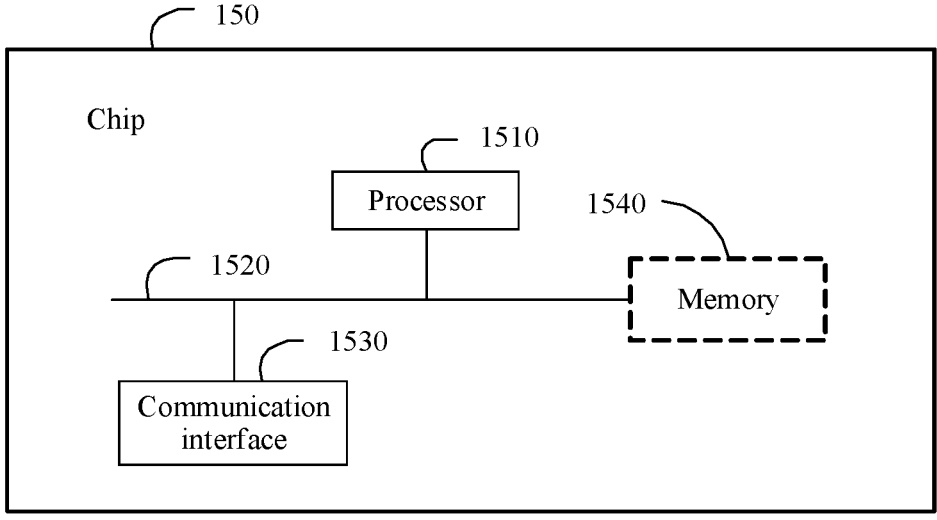
FIG. 14 is a schematic diagram of a structure of a chip according to an embodiment of this application.

FIG. 14 is a schematic diagram of a structure of a chip 150 according to an embodiment of the present disclosure. The chip 150 includes one or more (including two) processors 1510 (which may be the foregoing processing units) and a communication interface 1530.

In a possible embodiment, the chip 150 shown in FIG. 14 further includes a memory 1540. The memory 1540 may include a read-only memory and a random access memory, and provide operation instructions and data for the processor 1510. A part of the memory 1540 may further include a non-volatile random access memory (NVRAM).

In some embodiments, the memory 1540 stores the following elements: an executable module or a data structure, a subset thereof, or an extended set thereof.

In this embodiment of the present disclosure, a corresponding operation is performed by invoking the operation instructions stored in the memory 1540 (where the operation instructions may be stored in an operating system).

In some embodiments, a structure of a chip used in an SMF network element, a structure of a chip used in a UPF network element, a structure of a chip used in a PCF network element, and a structure of a chip used in a terminal device are similar, and different apparatuses may use different chips to implement respective functions.

The processor 1510 controls an operation of the SMF network element, the UPF network element, the PCF network element, or the terminal device, and the processor 1510 may also be referred to as a central processing unit (CPU). The memory 1540 may include a read-only memory and a random access memory, and provide instructions and data for the processor 1510. A part of the memory 1540 may further include a non-volatile random access memory (NVRAM). For example, in an application, the memory 1540, the communication interface 1530, and the memory 1540 are coupled together through a bus system 1520. The bus system 1520 may further include a power bus, a control bus, a status signal bus, and the like in addition to a data bus. However, for clear description, various types of buses in FIG. 14 are marked as the bus system 1520.

The foregoing communication unit may be an interface circuit or a communication interface of the apparatus, and is configured to receive a signal from another apparatus. For example, when the apparatus is implemented as a chip, the communication unit is an interface circuit or a communication interface that is of the chip and that is configured to receive a signal from or send a signal to another chip or apparatus.

The methods disclosed in the foregoing embodiments of the present disclosure may be applied to the processor 1510, or implemented by the processor 1510. The processor 1510 may be an integrated circuit chip and has a signal processing capability. In some embodiments, the operations in the foregoing method may be implemented using a hardware integrated logical circuit in the processor 1510, or using instructions in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1510 may implement or perform the methods, operations, and logical block diagrams that are disclosed in embodiments of the present disclosure. The general-purpose processor may be a microprocessor, or the processor may be any conventional processor or the like. The operations in the methods disclosed with reference to embodiments of the present disclosure may be directly performed by a hardware decoding processor, or may be performed using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the operations in the foregoing methods in combination with hardware of the processor.

In some embodiments, the communication interface 1530 is configured to perform receiving and sending operations of the SMF network element, the UPF network element, the PCF network element, or the terminal device in embodiments shown in FIG. 4 to FIG. 11. The processor 1510 is configured to perform processing operations of the SMF network element, the UPF network element, the PCF network element, or the terminal device in embodiments shown in FIG. 4 to FIG. 11.

In the foregoing embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, SSD), or the like.

An embodiment of this application further provides a computer-readable storage medium. All or some of the methods described in the foregoing embodiments may be implemented using software, hardware, firmware, or any combination thereof. If the methods are implemented in the software, functions may be used as one or more instructions or code and stored in the computer-readable medium or transmitted on the computer-readable medium. The computer-readable medium may include a computer storage medium and a communication medium, and may further include any medium that can transfer a computer program from one place to another. The storage medium may be any target medium accessible by a computer.

In some embodiments, the computer-readable medium may include a RAM, a ROM, an EEPROM, a CD-ROM, or another optical disc storage, a magnetic disk storage or another magnetic storage device, or any other medium that is used to carry or store required program code in a form of instructions or a data structure and that is accessible by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disc (CD), a laser disc, an optical disc, a digital versatile disc (DVD), a floppy disk, and a Blu-ray disc. The magnetic disks usually magnetically reproduce data, and the optical discs optically reproduce data using lasers. The foregoing combinations should also be included within a scope of the computer-readable medium.

An embodiment of this application further provides a computer program product. All or some of the methods described in the foregoing embodiments may be implemented using software, hardware, firmware, or any combination thereof. If the methods are implemented in the software, all or some of the methods may be implemented in a form of a computer program product. The computer program product includes one or more computer instructions. When the foregoing computer program instructions are loaded and executed on a computer, all or some of the procedures or functions described according to the foregoing method embodiments are generated. The computer may be a general-purpose computer, a dedicated computer, a computer network, a base station, a terminal, or another programmable apparatus.

The objectives, technical solutions, and benefits of the present disclosure are further described in detail in the foregoing embodiments. It should be understood that the foregoing descriptions are merely embodiments of the present disclosure, but are not intended to limit the protection scope of the present disclosure. Any modification, equivalent replacement, or improvement made on the basis of the technical solutions of the present disclosure shall fall within the protection scope of the present disclosure.

It should be noted that the network elements in embodiments of this application may alternatively use other definitions or names in application. For example, the SMF network element may be referred to as a first core network element, the UPF network element may be referred to as a second core network element, the PCF network element may be referred to as a third core network element, the AMF network element may be referred to as a fourth core network element. Alternatively, the foregoing network elements may also be collectively referred to as core network elements. Alternatively, other names may be defined for the foregoing network elements based on actual functions. This is not specifically limited in embodiments of this application.

What is claimed is:

1. A communication method, comprising:
receiving, by a control network element, second indication information that indicates that a first service data flow needs to be associated with a second service data flow;
determining, by the control network element, whether to use a same transmission path for both the first service data flow and the second service data flow;
responsive to determining to use the same transmission path for both the first service data flow and the second service data flow, sending, by the control network element, first indication information to a target network element, wherein the first indication information comprises an indication to the target network element to transmit the first service data flow through the same transmission path as the second service data flow; and
sending, by the control network element, identification information of the first service data flow, identification information of the second service data flow, and information about a transmission mode of the second service data flow to the target network element.

2. The method according to claim 1, wherein:
the first indication information indicates, to the target network element, to transmit the first service data flow in a preset transmission mode, wherein in the preset transmission mode, the first service data flow and the second service data flow are transmitted through the same transmission path.

3. The method according to claim 1, wherein the first indication information comprises identification information of the first service data flow and identification information of the second service data flow.

4. The method according to claim 1, further comprising:
sending, by the control network element, identification information of the first service data flow and identification information of the second service data flow to the target network element.

5. The method according to claim 1, further comprising:
sending, by the control network element to the target network element, identification information of the first service data flow, identification information of the second service data flow, and information about a transmission mode used by both the first service data flow and the second service data flow.

6. The method according to claim 1, wherein the second indication information is received from an application layer network element.

7. The method according to claim 1, wherein the second indication information is received from a user plane network element.

8. The method according to claim 7, wherein the second indication information is a reported event.

9. The method according to claim 1, further comprising:
sending, by the control network element, the first indication information to the target network element via a session management network element; or sending, by the control network element, the first indication information to the target network element via the session management network element and a mobility management network element.

10. The method according to claim 1, wherein a service data flow identifier comprises one or more of the following:

a service data flow 5-tuple identifier, an application identifier, a quality of service (QOS) flow identifier, a service type identifier, an application type identifier, or a service data flow address identifier.

11. The method according to claim 1, wherein the same transmission path comprises a first transmission path using a first access technology and/or a second transmission path using a second access technology.

12. The method according to claim 1, further comprising:

obtaining, by a user plane network element, the first indication information from the control network element; and transmitting, by the user plane network element based on the first indication information, the first service data flow through the same transmission path as the second service data flow.

13. A communication method, comprising:

sending, by a user plane network element, second indication information to a control network element that indicates that a first service data flow needs to be associated with a second service data flow;

obtaining, by the user plane network element, first indication information from the control network element, wherein the first indication information comprises an indication to the user plane network element to transmit the first service data flow through a same transmission path as the second service data flow;

obtaining, by the control network element, identification information of the first service data flow, identification information of the second service data flow, and information about a transmission mode of the second service data flow to a target network element; and responsive to obtaining the first indication information from the control network element, transmitting, by the user plane network element based on the first indication information, the first service data flow through the same transmission path as the second service data flow.

14. The method according to claim 13, wherein the user plane network element determines that the first service data flow and the second service data flow need to be associated.

15. The method according to claim 14, wherein the second indication information is a reported event.

16. The method according to claim 14, further comprising:

determining, by the user plane network element based on destination addresses of the first service data flow and the second service data flow, that the first service data flow and the second service data flow need to be associated.

17. A communication apparatus, comprising:

a memory that stores program instructions; and a processor, that is operatively coupled to the memory, to:

receive second indication information that indicates that a first service data flow needs to be associated with a second service data flow;

determine whether to use a same transmission path for both the first service data flow and the second service data flow;

responsive to determine to use the same transmission path for both the first service data flow and the second service data flow, send first indication information to a target network element, wherein the first indication information comprises an indication to the target network element to transmit the first service data flow through the same transmission path as the second service data flow; and send identification information of the first service data flow and identification information of the second service data flow to the target network element.

18. The apparatus according to claim 17, wherein the processor is to execute the program instructions in the memory to cause the apparatus to send identification information of the first service data flow, identification information of the second service data flow, and information about a transmission mode of the second service data flow to the target network element.

19. The apparatus according to claim 17, wherein the processor is to execute the program instructions in the memory to cause the apparatus to:

send identification information of the first service data flow, identification information of the second service data flow, and information about a transmission mode used by both the first service data flow and the second service data flow.

20. The apparatus according to claim 17, wherein the second indication information is received from an application layer network element.

* * * * *